US012110106B2

(12) United States Patent
Akers et al.

(10) Patent No.: US 12,110,106 B2
(45) Date of Patent: Oct. 8, 2024

(54) AERIAL VEHICLE WITH DIFFERENTIAL CONTROL MECHANISMS

(71) Applicant: Joby Aero, Inc., Santa Cruz, CA (US)

(72) Inventors: Thomas Akers, Templeton, CA (US); Peter Kalogiannis, Tehachapi, CA (US); Mark Moore, Henderson, NV (US); Robert Alan McDonald, San Luis Obispo, CA (US); Ian Andreas Villa, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 593 days.

(21) Appl. No.: 16/949,414

(22) Filed: Oct. 28, 2020

(65) Prior Publication Data

US 2021/0122466 A1 Apr. 29, 2021

Related U.S. Application Data

(60) Provisional application No. 62/927,099, filed on Oct. 28, 2019.

(51) Int. Cl.
*B64C 27/52* (2006.01)
*B64C 29/00* (2006.01)
(Continued)

(52) U.S. Cl.
CPC .............. *B64C 29/02* (2013.01); *B64C 27/52* (2013.01); *B64C 29/0033* (2013.01);
(Continued)

(58) Field of Classification Search
CPC ........ B64U 10/10; B64U 10/13; B64U 10/14; B64U 10/20; B64U 30/16; B64U 30/29;
(Continued)

(56) References Cited

U.S. PATENT DOCUMENTS 3,059,876 A * 10/1962 Platt .................... B64C 29/0033
244/7 C
3,107,882 A * 10/1963 Matteson ............ B64C 29/0033
244/90 R
(Continued)

FOREIGN PATENT DOCUMENTS

RU 2543120 C1 * 2/2015
RU 2547155 C1 * 4/2015
(Continued)

*Primary Examiner* — Christopher D Hutchens
*Assistant Examiner* — Michael A. Fabula
(74) *Attorney, Agent, or Firm* — Michael A. Guth

(57) ABSTRACT

An aerial vehicle may have a fuselage, a first wing member, and a second wing member. The fuselage may have a nose end and a tail end. The first wing member may extend from the fuselage and comprise a first drive motor coupled to the first rotor. The second wing member may also extend from the fuselage substantially opposite the first wing member and may comprise a second drive motor coupled to a second rotor. A first motor may be coupled to rotate the first wing member and the first rotor about a first axis substantially perpendicular to a fuselage axis extending from the nose end to the tail end. A second motor may be coupled to rotate the second wing member and the second rotor about a second axis substantially perpendicular to the fuselage axis. A controller circuit may be configured to differentially actuate the first motor and the second motor.

9 Claims, 23 Drawing Sheets

(51) Int. Cl.
*B64C 29/02* (2006.01)
*B64U 10/25* (2023.01)
*B64U 30/20* (2023.01)
*B64U 50/19* (2023.01)
*B64U 70/80* (2023.01)

(52) U.S. Cl.
CPC .............. *B64U 10/25* (2023.01); *B64U 30/20* (2023.01); *B64U 50/19* (2023.01); *B64U 70/80* (2023.01)

(58) Field of Classification Search
CPC .... B64U 30/296; B64U 30/297; B64U 30/20; B64U 10/25; B64C 27/52; B64C 2201/024; B64C 2201/027; B64C 2201/042; B64C 2201/108; B64C 29/0033
See application file for complete search history.

(56) References Cited

U.S. PATENT DOCUMENTS

| | | | | |
|---|---|---|---|---|
| 3,168,067 | A * | 2/1965 | Waldemar | B63B 1/18 114/280 |
| 3,666,209 | A * | 5/1972 | Taylor | B64C 29/0033 244/12.4 |
| 5,374,010 | A * | 12/1994 | Stone | B64C 29/0025 244/45 R |
| 6,607,161 | B1 * | 8/2003 | Krysinski | B64C 29/0033 244/7 C |
| 6,868,315 | B2 * | 3/2005 | Hellio | G05D 1/0858 701/4 |
| 7,326,036 | B1 * | 2/2008 | Habin | B64C 27/59 416/170 R |
| 7,861,967 | B2 * | 1/2011 | Karem | B64C 27/28 244/12.4 |
| 7,871,033 | B2 * | 1/2011 | Karem | B64C 29/0033 244/17.23 |
| 8,733,690 | B2 * | 5/2014 | Bevirt | B64C 29/0033 244/17.23 |
| 8,907,595 | B2 * | 12/2014 | Weibel | H02P 9/007 318/727 |
| 9,475,579 | B2 * | 10/2016 | Fredericks | B64C 5/02 |
| 9,493,235 | B2 * | 11/2016 | Zhou | G05D 1/048 |
| 9,896,200 | B2 | 2/2018 | Fredericks et al. | |
| 10,071,801 | B2 | 9/2018 | North et al. | |
| 10,101,736 | B1 * | 10/2018 | Beard | G05B 24/02 |
| 10,392,107 | B2 * | 8/2019 | Har | B64D 27/24 |
| 10,418,868 | B1 * | 9/2019 | Long | H02K 16/02 |
| 10,486,806 | B2 * | 11/2019 | Alber | B64C 29/0033 |
| 10,538,321 | B2 | 1/2020 | North et al. | |
| 10,625,852 | B2 * | 4/2020 | Bevirt | B64C 39/068 |
| 10,974,827 | B2 * | 4/2021 | Bevirt | B64C 11/46 |
| 10,988,248 | B2 * | 4/2021 | Mikić | B64C 27/52 |
| 2005/0230519 | A1 * | 10/2005 | Hurley | B64C 29/0033 244/7 C |
| 2009/0256026 | A1 * | 10/2009 | Karem | B64C 27/08 244/99.2 |
| 2010/0193644 | A1 * | 8/2010 | Karem | B64C 29/0033 244/7 R |
| 2014/0061392 | A1 * | 3/2014 | Karem | B64C 11/26 244/7 R |
| 2015/0266571 | A1 * | 9/2015 | Bevirt | B64C 29/0033 244/7 C |
| 2016/0083075 | A1 * | 3/2016 | Moxon | B64D 45/00 244/13 |
| 2016/0107751 | A1 * | 4/2016 | D'Andrea | B64C 27/08 701/4 |
| 2016/0244158 | A1 * | 8/2016 | Fredericks | B64C 3/40 |
| 2016/0340051 | A1 * | 11/2016 | Edwards | B64D 35/02 |
| 2016/0365810 | A1 * | 12/2016 | Armstrong | H02P 3/18 |
| 2017/0297698 | A1 * | 10/2017 | Alber | B64C 5/10 |
| 2018/0044013 | A1 * | 2/2018 | Groninga | B64C 15/12 |
| 2018/0065739 | A1 * | 3/2018 | Vondrell | B64C 29/0033 |
| 2018/0065740 | A1 * | 3/2018 | Vondrell | B64C 29/0033 |
| 2018/0065741 | A1 * | 3/2018 | Vondrell | B64C 11/28 |
| 2018/0065742 | A1 * | 3/2018 | Vondrell | B64C 21/06 |
| 2018/0065743 | A1 * | 3/2018 | Vondrell | B64C 21/06 |
| 2018/0086446 | A1 * | 3/2018 | Alber | B64D 35/08 |
| 2018/0178910 | A1 * | 6/2018 | Har | B64C 3/385 |
| 2018/0233990 | A1 * | 8/2018 | Vu | H02K 1/148 |
| 2018/0307231 | A1 * | 10/2018 | Sorton | B64D 31/06 |
| 2018/0334251 | A1 * | 11/2018 | Karem | B64C 5/02 |
| 2018/0362169 | A1 * | 12/2018 | Du | B64C 39/08 |
| 2020/0108919 | A1 * | 4/2020 | Sada | B64C 27/02 |
| 2020/0301446 | A1 * | 9/2020 | Leong | B64C 29/0033 |
| 2020/0317353 | A1 * | 10/2020 | Bevirt | B64D 27/24 |
| 2020/0361601 | A1 * | 11/2020 | Mikic | B64C 3/38 |
| 2021/0075303 | A1 * | 3/2021 | Seminel | H02K 11/0094 |
| 2021/0371096 | A1 * | 12/2021 | Anderson | B64C 39/12 |

FOREIGN PATENT DOCUMENTS

| | | | | |
|---|---|---|---|---|
| RU | 2554043 | C1 * | 6/2015 | |
| WO | WO-0119673 | A1 * | 3/2001 | .............. B64C 13/16 |
| WO | WO-2009071267 | A2 * | 6/2009 | .............. H02P 8/12 |
| WO | WO-2019217920 | A1 * | 11/2019 | .............. B64C 11/46 |

* cited by examiner

AERIAL VEHICLE WITH DIFFERENTIAL CONTROL MECHANISMS

CLAIM FOR PRIORITY

This application claims the benefit of priority of U.S. application Ser. No. 62/927,099, filed Oct. 28, 2019, which is hereby incorporated by reference in its entirety.

BACKGROUND

Aerial vehicles (AVs) can broadly be classified as manned or unmanned. An unmanned aerial vehicle (UAV) (e.g., a drone or larger AV) is an aircraft without a human pilot on board and a type of unmanned vehicle. UAVs are a component of an unmanned aircraft system (UAS); which includes a UAV, a ground-based controller, and a system of communications between the two. The flight of UAVs may operate with various degrees of autonomy: either under remote control by a human operator or autonomously by onboard computers. AV's may employ many different designs, one of which is a VTOL design. A vertical take-off and landing (VTOL) aerial vehicle (AV) or aircraft is one that can hover, take off, and land vertically. This classification can include a variety of types of aircraft including fixed-wing aircraft as well as helicopters and other aircraft with powered rotors, such as cyclogyros/cyclocopters and tiltrotors. Some VTOL aircraft can operate in other modes as well, such as CTOL (conventional take-off and landing), STOL (short take-off and landing), and/or STOVL (short take-off and vertical landing). Others, such as some helicopters, can only operate by VTOL, due to the aircraft lacking landing gear that can handle horizontal motion. VTOL is a subset of V/STOL (vertical and/or short take-off and landing). Some lighter-than-air aircraft also qualify as VTOL aircraft, as they can hover, takeoff, and land with vertical approach/departure profiles.

DRAWINGS

The present disclosure is illustrated by way of example and not limitation in the following figures.

DETAILED DESCRIPTION

Figure 1:
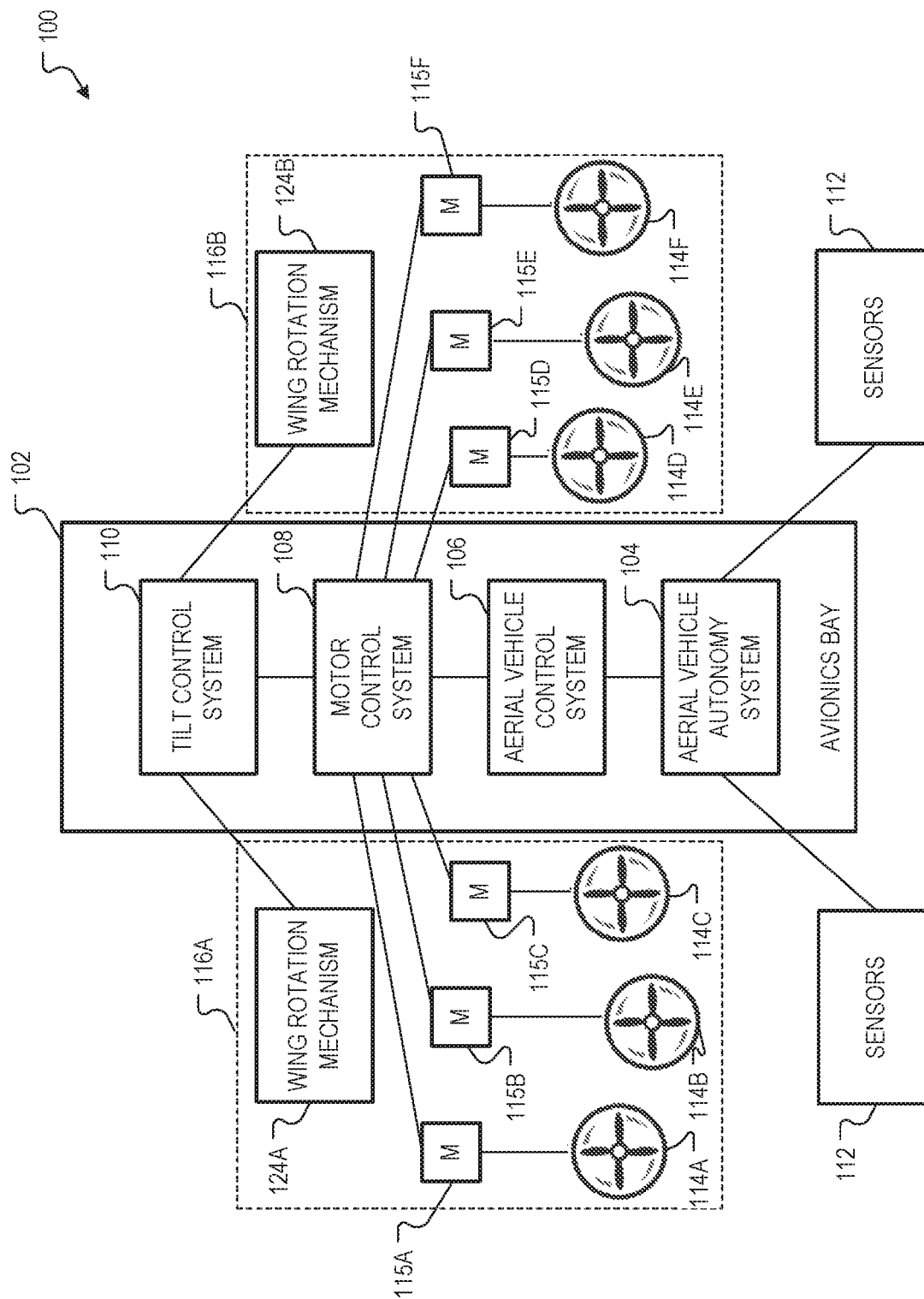
FIG. 1 is a block diagram illustrating an example avionics system for an aerial vehicle, in accordance with some example embodiments.

Examples relate to an aerial vehicle comprising a fuselage incorporating a payload bay for operatively receiving and holding a payload. The aerial vehicle further includes at least one tilt rotor on a port side of the aerial vehicle at least one tilt rotor on the right side of the aerial vehicle. Tilt rotors may be included in tiltable nacelles and/or on may be fixed on a tiltable wing. An aerial vehicle control system is configured to differentially tilt the port-side rotor or rotors and the right-side rotor or rotors to generate a torque that tends to change the attitude of the aerial vehicle in a desired way.

In some examples, one or more motors driving the one or more rotors of the aerial vehicle is configured to include multiple independent motor windings along with a single rotor and a single stator. In some examples, the motor includes triplex motor windings. Each motor winding is commutated by an independent controller. The motor windings can be commutated to compensate for winding and/or controller failure. For example, if a motor winding or the controller for a motor winding fails, one or more other windings of the motor can be commutated differently to compensate for the failure. In some examples, if a motor winding (or corresponding controller) fails, additional current is provided to one or more other windings of the same motor to drive the rotor to the same level of thrust that would have been generated in the absence of the failure.

If the remaining operational winding or windings on a motor or unable to maintain the desired level of thrust at the rotor, in some examples, the aerial vehicle may make adjustments to the commanded thrust level on other motors to maintain vehicle control. For example, if a motor winding and/or corresponding controller on one wing fails, the aerial vehicle may be configured to disable a motor winding and/or reduce the commanded level of thrust on a corresponding motor of the opposite wing. In this way, the aerial vehicle can compensate for the failure of the motor winding or its controller without completely disabling the corresponding motor on the opposite wing. In some examples, the motor windings can be differentially commutated to generate various torques that can also act on the aerial vehicle tending to change the attitude of the aerial vehicle.

The aerial vehicle control system may utilize differential tilting of the rotors to generate moments of torque and/or thrust vectors that tend to change the attitude of the aerial vehicle and/or cause it to move in a desired direction. In some examples, differential tilt rotors replace some or all of the functionality of other control surfaces of the aerial vehicle, such as elevators, ailerons, rudders, etc. In some examples, this may allow for the use of smaller control surfaces and/or provide greater robustness to control surface failure. In some examples, differential tilt rotors can be used to completely replace other movable control surfaces, which can simplify the aerial vehicle and reduce the number of potential points of failure.

According to some example embodiments, there is provided a vertical takeoff and landing (VTOL) aerial vehicle (AV) (VTOL AV) having electric motors and tilt control systems that reduce or eliminate the use of articulating control surfaces, such as elevators, ailerons, and rudders by utilizing differential tilt rotors and/or differentially commutated electric motors.

FIG. 1 is a block diagram illustrating an avionics system 100, including an aerial vehicle control system 106, an aerial vehicle autonomy system 104, an electric motor control system 108 and tilt control system 110. The avionics system 100 may be primarily located within an avionics bay 102 of an aerial vehicle.

Turning to each of the respective components, the aerial vehicle autonomy system 104 is responsible for autonomous or semiautonomous operation of an aerial vehicle and is communicatively coupled to sensors 112 of the relevant aerial vehicle. The sensors 112 may include LIDAR sensors, radar sensors, and cameras, merely for example. The aerial vehicle autonomy system 104 is communicatively coupled to the primary aerial vehicle control system 106, which is, in turn, coupled to the various pitch, yaw, and throttle controllers of the aerial vehicle.

The aerial vehicle control system 106 may further control the electric motor control system 108. The electric motor control system 108, in turn, operationally controls electric motors that drive corresponding rotors (or propulsors) of the aerial vehicle. In the example shown in FIG. 1, six motors 115A, 115B, 115C, 115D, 115E, 115F and six corresponding rotors 114A, 114B, 114C, 114D, 114E, 114F are shown. The electric motor 115A drives the rotor 114A, the electric motor 115B drives the rotor 114B and so on.

In the example shown in FIG. 1, the rotors include right-side rotors 114A, 114B, 114C and left-side rotors 114C, 114D, 114E, The right-side rotors 114A, 114B, 114C are fixedly coupled to a right wing member 116A and left-side rotors 114D, 114E, 114F are fixedly coupled to a left-side wing member 116B. The various rotors 114A, 114B, 114C, 114D, 114E, 114F can be tilted as their respective wings 116A, 116B are tilted, as described herein. In other examples, one or more of the rotors 114A, 114B, 114C, 114D, 114E, 114F and/or corresponding electric motors 115A, 115B, 115C, 115D, 115E, 115F can be independently tilted. For example, one or more of the rotors 114A, 114B, 114C, 114D, 114E, 114F and/or corresponding electric motors 115A, 115B, 115C, 115D, 115E, 115F may be incorporated into a tiltable nacelle.

In some examples, one or more of the electric motors 115A, 115B, 115C, 115D, 115E, 115F include multiple (e.g., triplex) windings. The electric motor control system 108 may include separate motor controllers for the respective windings. Consider an example in which each electric motor 115A, 115B, 115C, 115D, 115E, 115F includes three windings. In this example, the motor control system 108 could include eighteen independent motor controllers, with one motor controller for each of the respective windings of the electric motors 115A, 115B, 115C, 115D, 115E, 115F. For example, a first motor controller of the motor control system 108 may drive a first motor winding of an electric motor 115A. A second motor controller of the motor control system 108 may drive a second motor winding of the motor 115A, and so on. The electric motor control system 108 may differentially commutate the various motor windings, as described herein, to compensate for failures of a motor winding and/or of an associated motor controller. For example, if the motor controller that controls a first winding of the motor driving the rotor 114E fails, then the electric motor control system 108 may compensate by increasing the current provided to the remaining operational windings of the motor driving the rotor 114B. If the electric motor control system 108 is unable to maintain the desired level of thrusting the remaining windings, then the electric motor control system 108 may deactivate a corresponding motor winding of motor that drives the rotor 114E and/or otherwise recite the commanded thrust at the motor that drives the rotor 114E. In some examples, the motor control system 108 is also configured to differentially commutate the windings of the motors 115A, 115B, 115C, 115D, 115E, 115F to create various torques that tend to change the attitude of the aerial vehicle.

The aerial vehicle control system 106 is furthermore communicatively coupled to, and controls, a tilt control system 110. The tilt control system 110 is responsible for the tilting or rotation of wing members 116A, 116B and/or various other components of the aerial vehicle in order to provide enhanced control and flight stability of the aerial vehicle, as well as the implementation of countermeasures to mitigate the impact of an electrical or component failure of the aerial vehicle. To this end, the tilt control system 110 is shown to be communicatively coupled to respective wing rotation mechanisms 124A, 124B (e.g., which include a motor or other suitable rotator to rotate the respective rotor wings 116A, 116B). The tilt control system 110 is configured to control the wing rotation mechanisms 124A, 124B to differentially tilt the wings 116A, 116B (and/or rotors thereof) to generate moment of torques that tend to change the attitude of the aerial vehicle. For example, the tilt control system 110 may generate a change to the pitch of the aerial vehicle by tilting both wings 116A, 116B forward (towards a nose end of the aerial vehicle) or backward (towards a tail end of the vehicle). Similarly, the tilt control system 110 may generate a yaw and/or roll by differentially tilting the wings 116A, 116B (e.g., tilting one wing member forwards and the other wing backwards).

In some examples, the aerial vehicle control system 106 is configured to mix the use of wing tilts and differential rotor speeds to generate an appropriate attitude and/or thrust vector for the aerial vehicle. The mix of motor winding and differential rotor speeds may be determined based on various factors including, for example, a desired mode of the aerial vehicle (e.g., fuel efficiency, optimum control response, noise minimization).

In some examples, the aerial vehicle control system 106 is configured to operate the aerial vehicle in different modes at different altitudes. In some examples, when the aerial vehicle is below a threshold altitude (e.g., 10 meters, 20 meters, 50 meters, 100 meters, etc.), the aerial vehicle control system 106 operates the aerial vehicle in a mode that rotates the rotors 114A, 114B, 114C, 114D, 114E, 114F at a constant speed and generates thrust vectors and/or moments of torque to change the attitude of the aerial vehicle by tilting the wing members 116A, 116B and/or individual rotors 114A, 114B, 114C, 114D, 114E, 114F. Above the threshold altitude, the aerial vehicle control system 106 may operate the vehicle in a second mode in which wing member tilts and changes to rotor speed are used to generate thrust vectors and/or moments of torque. This may reduce the obtrusiveness of the noise generated by the aerial vehicle when the vehicle is at lower altitudes where it might encounter humans, animals, and/or noise sensitive equipment.

Also, in some examples, the aerial vehicle control system 106 is configured to tilt the wing members 116A, 116B towards a nose end of a fuselage of the aerial vehicle to generate a thrust vector towards a nose end of the fuselage while the fuselage axis is substantially parallel to the horizon. This may allow the aerial vehicle to travel parallel to the horizon with the fuselage also parallel to the horizon. When the aerial vehicle is used to carry passengers and/or cargo, this reduces the jostling of the passengers or cargo and may help the prevention of spilling or otherwise spoiling cargo.

In some circumstances, the aerial vehicle control system 106 is configured to tilt the wing members 116A, 116B to position in which a fuselage of the aircraft is at an angle that is not parallel to the horizon while generating a vertical thrust vector. In this way, for example, the aerial vehicle may be able to take off and/or land vertically from a surface that is not parallel to the horizon such as, for example, a hill or other incline, a vehicle parked on a hill or other incline, etc.

In some examples, the aerial vehicle control system 106 is programmed to utilize the aerial vehicle control system 106 to compensate for failures. In some examples, the wing rotation mechanisms 124A, 124B may be configured such that it is difficult and/or unlikely that aerodynamic forces will cause tilting of the wing members 116A, 116B without action from a motor or other drive device of the wing rotation mechanisms 124A, 124B. For example, the wing rotation mechanisms 124A, 124B may comprise respective motors and gearboxes that couple the motors to the respective wing members 116A, 116B. The gear ratio for the gearboxes may be selected such that expected aerodynamic forces on the wing members 116A, 116B during normal flight do not cause the wing members 116A, 116B to rotate absent input from the tilt control system 110.

As a result, if one wing rotation mechanism 124A, 124B experiences a failure and can no longer move, the aerial vehicle control system 106 may be configured to compensate by selecting a position of the wing member 116A, 116B having an active wing rotation mechanism 124A, 124B that generates a thrust vector and/or torque that effectuates an instruction provided by the aerial vehicle autonomy system 104.

In some examples, an aerial vehicle utilizing the avionics system 100 with tiltable wing members 116A, 116B (and/or individually tiltable rotors 114A, 114B, 114C, 114D, 114E, 114F) may be operated without additional movable control surfaces. For example, an aerial vehicle utilizing the avionics system 100 as described herein may be implemented with a stationary tail.

Figure 2:
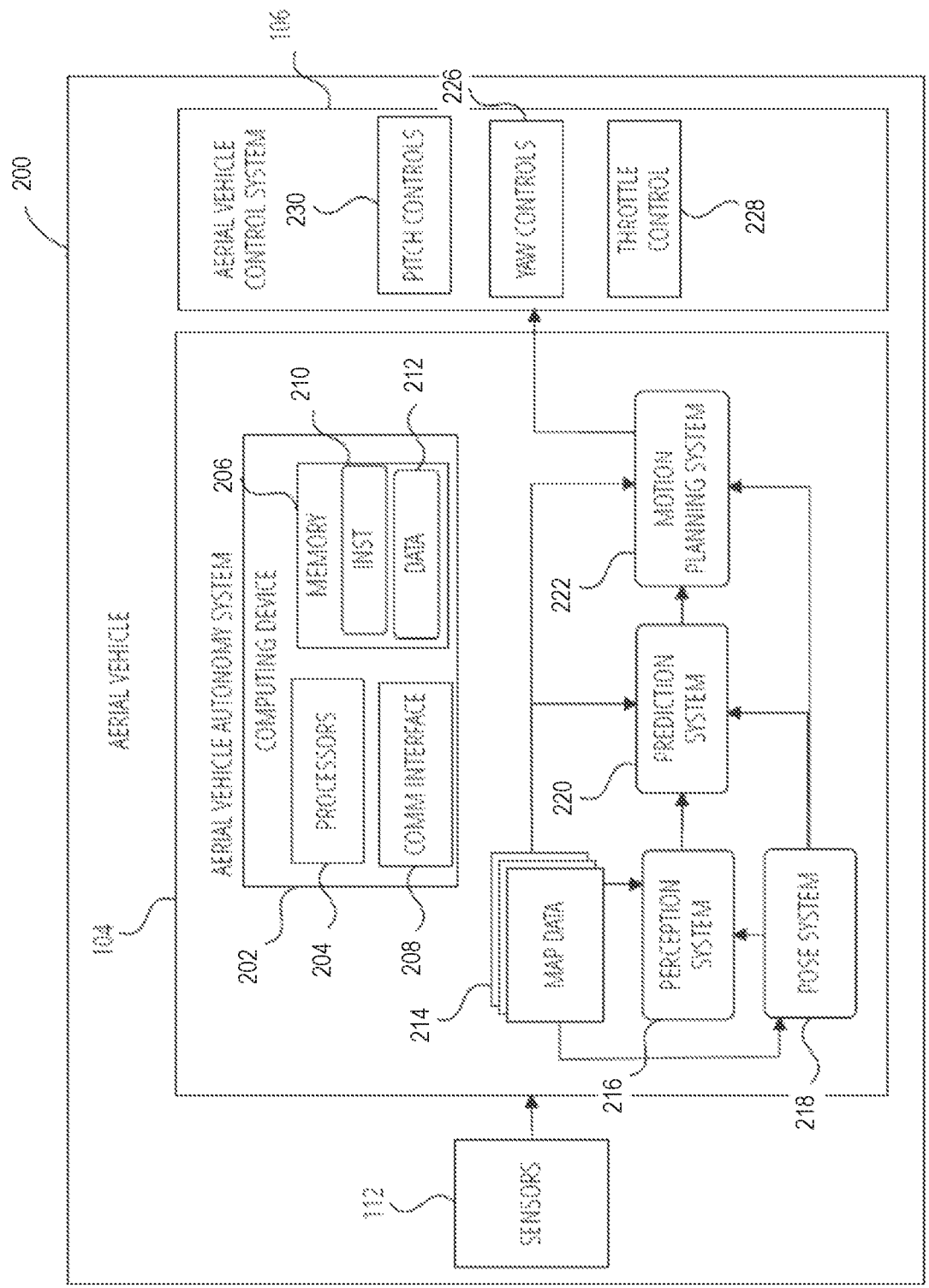
FIG. 2 is a block diagram showing an example system architecture of an aerial vehicle according to example aspects of the present disclosure.

FIG. 2 is a block diagram showing a system architecture of an aerial vehicle 200, according to example aspects of the present disclosure. The aerial vehicle 200 can be, for example, an autonomous or semi-autonomous aerial vehicle. The aerial vehicle 200 includes one or more sensors 112, an aerial vehicle autonomy system 104, and an aerial vehicle control system 106.

The aerial vehicle autonomy system 104 can be engaged to control the aerial vehicle 200 or to assist in controlling the aerial vehicle 200. In particular, the aerial vehicle autonomy system 104 receives sensor data from the sensors 112, attempts to comprehend the environment surrounding the aerial vehicle 200 by performing various processing techniques on data collected by the sensors 112, and generates an appropriate motion path through an environment. The aerial vehicle autonomy system 104 can control the aerial vehicle control system 106 to operate the aerial vehicle 200 according to the motion path.

The aerial vehicle autonomy system 104 includes a perception system 216, a prediction system 220, a motion planning system 222, and a pose system 218 that cooperate to perceive the surrounding environment of the aerial vehicle 200 and determine a motion plan for controlling the motion of the aerial vehicle 200 accordingly.

Various portions of the aerial vehicle autonomy system 104 receive sensor data from the sensors 112. For example, the sensors 112 may include remote-detection sensors as well as motion sensors such as an inertial measurement unit (MU), one or more encoders, etc. The sensor data can include information that describes the location of objects within the surrounding environment of the aerial vehicle 200, information that describes the motion of the vehicle, etc.

The sensors 112 may also include one or more remote-detection sensors or sensor systems, such as a LIDAR, a RADAR, one or more cameras, etc. As one example, a LIDAR system of the sensors 112 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of flight (TOF) that it takes a short laser pulse to travel from the sensor to an object and back, calculating the distance from the known speed of light.

As another example, a RADAR system of the sensors 112 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 112 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 112 can include a positioning system. The positioning system can determine a current position of the aerial vehicle 200. The positioning system can be any device or circuitry for analyzing the position of the aerial vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points) and/or other suitable techniques. The position of the aerial vehicle 200 can be used by various systems of the aerial vehicle autonomy system 104.

Thus, the sensors 112 can be used to collect sensor data that includes information that describes the location (e.g., in three-dimensional space relative to the aerial vehicle 200) of points that correspond to objects within the surrounding environment of the aerial vehicle 200. In some implementations, the sensors 112 can be located at various different locations on the aerial vehicle 200.

The pose system 218 receives some or all of the sensor data from the sensors 112 and generates vehicle poses for the aerial vehicle 200. A vehicle pose describes the position (including altitude) and attitude of the vehicle. The position of the aerial vehicle 200 is a point in a three dimensional space. In some examples, the position is described by values for a set of Cartesian coordinates, although any other suitable coordinate system may be used. The attitude of the aerial vehicle 200 generally describes the way in which the aerial vehicle 200 is oriented at its position. In some examples, attitude is described by a yaw about the vertical axis, a pitch about a first horizontal axis, and a roll about a second horizontal axis. In some examples, the pose system 218 generates vehicle poses periodically (e.g., every second, every half second) The pose system 218 appends time stamps to vehicle poses, where the time stamp for a pose indicates the point in time that is described by the pose. The pose system 218 generates vehicle poses by comparing sensor data (e.g., remote sensor data) to map data 214 describing the surrounding environment of the aerial vehicle 200.

In some examples, the pose system 218 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 218 generates vehicle poses. Accordingly, the pose filter generates some vehicle poses by extrapolating from a previous pose estimates.

The perception system 216 detects objects in the surrounding environment of the aerial vehicle 200 based on the sensor data, the map data 214, and/or vehicle poses provided by the pose system 218. The map data 214, for example, may provide detailed information about the surrounding environment of the aerial vehicle 200. The map data 214 can provide information regarding the identity and location of geographic places and entities, with specific details related to landing and take-off considerations (e.g., the location of pylons and other obstacles) The map data 214 may be used by the aerial vehicle autonomy system 104 in comprehending and perceiving its surrounding environment and its relationship thereto. The perception system 216 uses vehicle poses provided by the pose system 218 to place aerial vehicle 200 in the environment.

In some examples, the perception system 216 determines state data for objects in the surrounding environment of the aerial vehicle 200. State data may describe a current state of an object (also referred to as features of the object) The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class; yaw rate; distance from the aerial vehicle 200; minimum path to interaction with the aerial vehicle 200; minimum time duration to interaction with the aerial vehicle 200; and/or other state information.

In some implementations, the perception system 216 can determine state data for each object over a number of iterations. In particular, the perception system 216 can update the state data for each object at each iteration. Thus, the perception system 216 can detect and track objects, such as vehicles, that are proximate to the aerial vehicle 200 over time.

The prediction system 220 is configured to predict future positions for an object or objects in the environment surrounding the aerial vehicle 200 (e.g., an object or objects detected by the perception system 216). The prediction system 220 can generate prediction data associated with objects detected by the perception system 216. In some examples, the prediction system 220 generates prediction data describing each of the respective objects detected by the perception system 216.

Prediction data for an object can be indicative of one or more predicted future locations of the object. For example, the prediction system 220 may predict where the object will be located within the next 5 seconds, 20 seconds, 200 seconds, etc. Prediction data for an object may indicate a predicted trajectory (e.g., predicted path) for the object within the surrounding environment of the aerial vehicle 200. For example, the predicted trajectory (e.g., path) can indicate a path along which the respective object is predicted to travel over time (and/or the speed at which the object is predicted to travel along the predicted path). The prediction system 220 generates prediction data for an object, for example, based on state data generated by the perception system 216. In some examples, the prediction system 220 also considers one or more vehicle poses generated by the pose system 218 and/or the map data 214.

In some examples, the prediction system 220 uses state data indicative of an object type or classification to predict a trajectory for the object. As an example, the prediction system 220 can use state data provided by the perception system 216 to determine that particular object (e.g., an object classified as a vehicle) has a given trajectory. The prediction system 220 can provide the predicted trajectories associated with the object(s) to the motion planning system 222.

In some implementations, the prediction system 220 is a goal-oriented prediction system that generates potential goals, selects the most likely potential goals, and develops trajectories by which the object can achieve the selected goals. For example, the prediction system 220 can include a scenario generation system that generates and/or scores the goals for an object and a scenario development system that determines the trajectories by which the object can achieve the goals. In some implementations, the prediction system 220 can include a machine-learned goal-scoring model, a machine-learned trajectory development model, and/or other machine-learned models.

The motion planning system 222 determines a motion plan for the aerial vehicle 200 based at least in part on the predicted trajectories associated with the objects within the surrounding environment of the aerial vehicle 200, the state data for the objects provided by the perception system 216, vehicle poses provided by the pose system 218, and/or the map data 214. Stated differently, given information about the current locations of objects and/or predicted trajectories of objects within the surrounding environment of the aerial vehicle 200, the motion planning system 222 can determine a motion plan for the aerial vehicle 200 that best navigates the aerial vehicle 200 relative to the objects at such locations and their predicted trajectories on acceptable roadways.

In some implementations, the motion planning system 222 can evaluate cost functions and/or one or more reward functions for each of one or more candidate motion plans for the aerial vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 222 can determine a total cost (e.g., a sum of the cost(s) and/or reward(s) provided by the cost function(s) and/or reward function(s)) of adhering to a particular candidate pathway. The motion planning system 222 can select or determine a motion plan for the aerial vehicle 200 based at least in part on the cost function(s) and the reward function(s). For example, the motion plan that minimizes the total cost can be selected or otherwise determined. The motion plan can be, for example, a path along which the aerial vehicle 200 will travel in one or more forthcoming time periods. In some implementations, the motion planning system 222 can be configured to iteratively update the motion plan for the aerial vehicle 200 as new sensor data is obtained from the sensors 112. For example, as new sensor data is obtained from the sensors 112, the sensor data can be analyzed by the perception system 216, the prediction system 220, and the motion planning system 222 to determine the motion plan.

Each of the perception system 216, the prediction system 220, the motion planning system 222, and the pose system 218, can be included in or otherwise a part of the aerial vehicle 200 configured to determine a motion plan based on data obtained from the sensors 112. For example, data obtained by the sensors 112 can be analyzed by each of the perception system 216, the prediction system 220, and the motion planning system 222 in a consecutive fashion in order to develop the motion plan. While FIG. 2 depicts elements suitable for use in the aerial vehicle autonomy system 104 according to example aspects of the present disclosure, one of ordinary skill in the art will recognize that other vehicle autonomy systems can be configured to determine a motion plan for an autonomous vehicle based on sensor data.

The motion planning system 222 can provide the motion plan to the aerial vehicle control system 106 to execute the motion plan. For example, the aerial vehicle control system 106 can include pitch control module 230, yaw control module 226, and a throttle control system 228, each of which can include various vehicle controls (e.g., actuators or other devices or motors that control power) to control the motion of the aerial vehicle 200. The various aerial vehicle control system 106 can include one or more controllers, control devices, motors, and/or processors.

A throttle control system 228 is configured to receive all or part of the motion plan and generate a throttle command. The throttle command is provided to an engine and/or engine controller, or other propulsion system component to control the engine or other propulsion system of the aerial vehicle 200. A pitch control module 230 is configured to receive all or part of the motion plan and to generate one or more throttle commands and/or commands to the wing rotation mechanisms 124A, 124B, as described herein, to modulate the pitch of the aerial vehicle 200. Similarly, a yaw control module 226 is configured to receive all or part of the motion plan and generate one or more throttle commands and/or commands to the wing rotation mechanisms, as described herein, to modulate the yaw of the aerial vehicle 200.

The aerial vehicle autonomy system 104 includes one or more computing devices, such as the computing device 202 which may implement all or parts of the perception system 216, the prediction system 220, the motion planning system 222 and/or the pose system 218. The example computing device 202 can include one or more processors 204 and one or more memory devices (collectively referred to as memory 206). The memory 206 may include instructions 210 for execution by the processors 204 and/or data 212 that can, for example, be acted upon by the processors 204. The processors 204 can be any suitable processing device (e.g., a processor core, a microprocessor, an Application Specific Integrated Circuit (ARC), a Field Programmable Gate Array (FPGA), a microcontroller, etc.) and can be one processor or a plurality of processors that are operatively connected. The memory 206 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The computing device 202 can also include a communications interface 208, which can allow the computing device 202 to communicate with other components of the aerial vehicle 200 or external computing systems, such as via one or more wired or wireless networks. Additional descriptions of hardware and software configurations for computing devices, such as the computing device 202 are provided herein.

Figure 3:
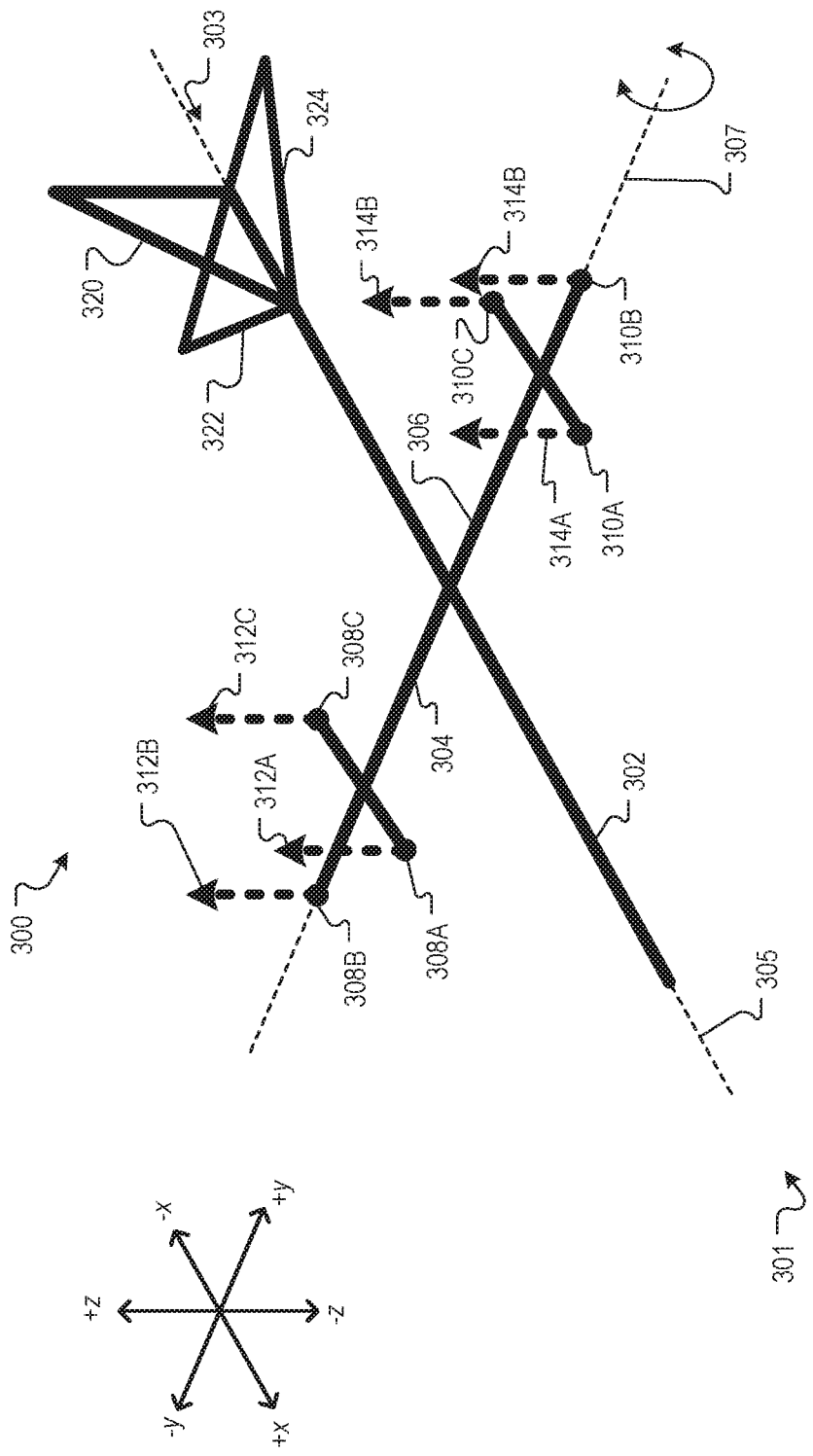
FIG. 3 is a diagram illustrating one example of an aerial vehicle utilizing differentially tiltable rotors.

FIG. 3 is a simplified diagram illustrating one example of an aerial vehicle 300 utilizing differentially tiltable rotors, 308A, 308B, 308C, 310A, 310B, 310C. The aerial vehicle 300 comprises a fuselage 302 having a nose end 301 and a tail end 303. Wing members 304 and 306 are tiltably mounted to the fuselage 302 and may be differentially tilted by a tilt control system 110 and tilt rotation mechanisms 124A, 124B, as described herein, to tilt the rotors 308A, 308B, 308C, 310A, 310B, 310C. The tail end 303 of the fuselage 302 includes horizontal stabilizers 322, 324 and a vertical stabilizer 320.

In some examples, the tiltable rotors 308A, 308B, 308C, 310A, 310B, 310C replace some or all of the functionality of other movable control surfaces on the aerial vehicle 300 such as elevators, rudders, trim tabs, ailerons, flaps or the like. For example, aerial vehicle 300 may have a stationary tail in which the vertical stabilizer 320 and/or the horizontal stabilizers 322, 324 do not include movable control surfaces such as rudders, elevators, or trim tabs.

In the example of FIG. 3, each rotor 308A, 308B, 308C, 310A, 310B, 310C generates a thrust that is represented by respective rotor vectors 312A, 312B, 312C, 314A, 314B, 314C. Each rotor vector 312A, 312B, 312C, 314A, 314B, 314C has a magnitude, determined by the amount of thrust that its respective rotor is generating, and a direction, indicated by the orientation of the respective rotor, for example, as determined by the orientation of its respective nacelle and/or wing member 304, 306.

The vector sum of the vectors 312A, 312B, 312C, 314A, 314B, 314C represents a thrust vector and/or moment of torque generated on the aerial vehicle 300. In the example of FIG. 3, all of the rotors 308A, 308B, 308C, 310A, 310B, 310C are generating equal thrust directed in the positive z direction, which may be perpendicular to the horizon. (In this example, the horizon is parallel to the xy plane.) Accordingly, the rotors 308A, 308B, 308C, 310A, 310B, 310C generate a thrust vector tending to propel the aerial vehicle 300 in the positive z direction (e.g., up) with the fuselage 302 parallel to the horizon.

Consider an example in which the rotors 308A, 308B, 308C of the wing member 304 are to remain in the position shown in FIG. 3 while the rotors 310A, 310B, 310C of the wing member 306 are rotated 45 degrees towards the nose end 301 of the aerial vehicle 300 with no change in the magnitude of thrust generated. In this example, the rotor vectors 314A, 314B, 314C will have a component in the positive x direction and a component in the positive z direction. As a result, a thrust vector for the aerial vehicle will be in the positive z direction, but a moment of torque will also be generated. The toque moment will have a component in the positive x direction tending to roll the aerial vehicle 300 counterclockwise about the x axis and a component in the negative z direction tending to cause the aerial vehicle 300 to yaw about the z axis. The differentially tiltable rotors 308A, 308B, 308C, 310A, 310B, 310C may be tiltable to numerous different positions to generate numerous different thrust vectors and moments of torque similar to the examples given here to affect the attitude of the aerial vehicle 300 and provide thrust. FIG. 3 also shows a fuselage axis 305 and an axis 307 that is substantially perpendicular to the fuselage axis 305. In some examples, the wing members 304, 306 tilt or rotate about the axis 307.

Figure 4:
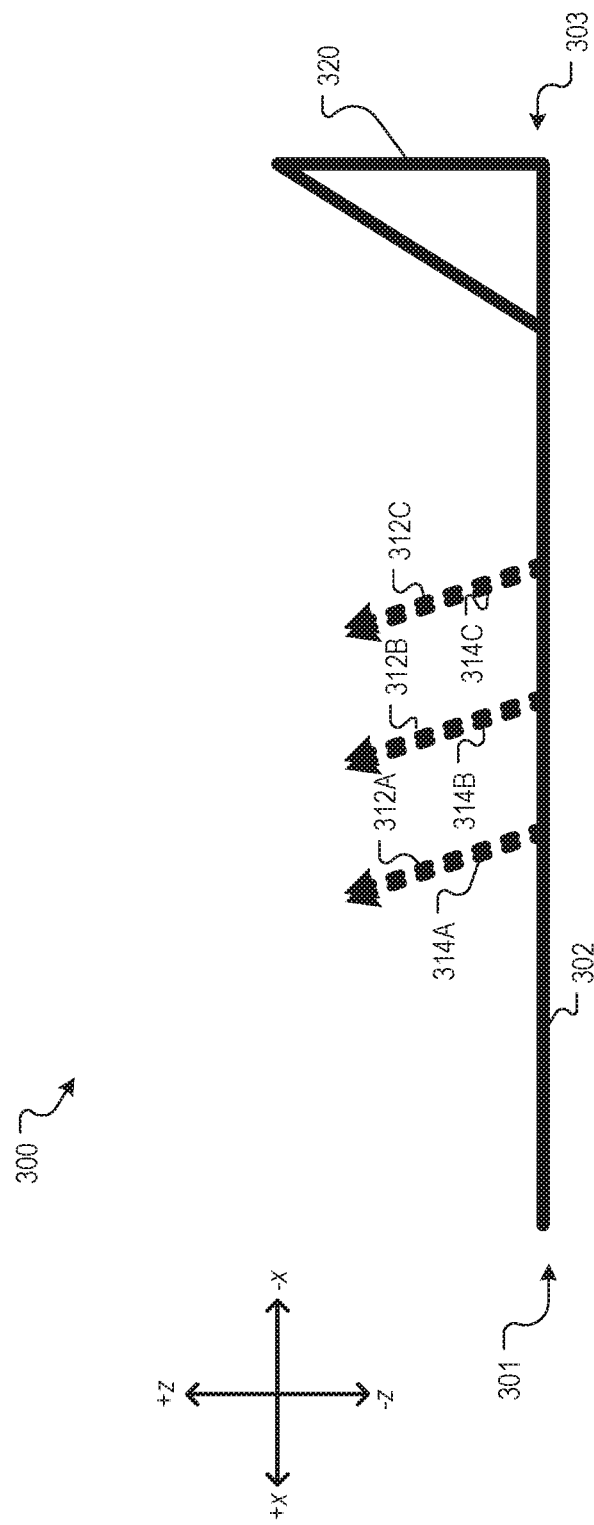
FIG. 4 is a diagram showing an example of the aerial vehicle of FIG. 3 with tiltable rotors tilted towards the nose end of the aerial vehicle.

FIG. 4 is a simplified diagram showing an example of the aerial vehicle 300 of FIG. 3 with tiltable rotors tilted towards the nose end 301 of the aerial vehicle 300. In the displayed configuration, rotor vectors 312A, 312B, 312C, 314A, 314B, 314C are directed to have components in the positive x and in the positive z direction, resulting in a thrust vector that tends to propel the aerial vehicle 300 forward in the positive x direction up in the positive z direction with the fuselage 302 parallel to the horizon (indicated by the x-axis). As shown in this configuration, the tiltable rotors may provide a component of lift to the aerial vehicle 300 in forward flight. In some examples, lift provided by the tiltable rotors can replace aerodynamic lift provided by the wing members and/or can supplement aerodynamic lift provided by the wing members.

Figure 5:
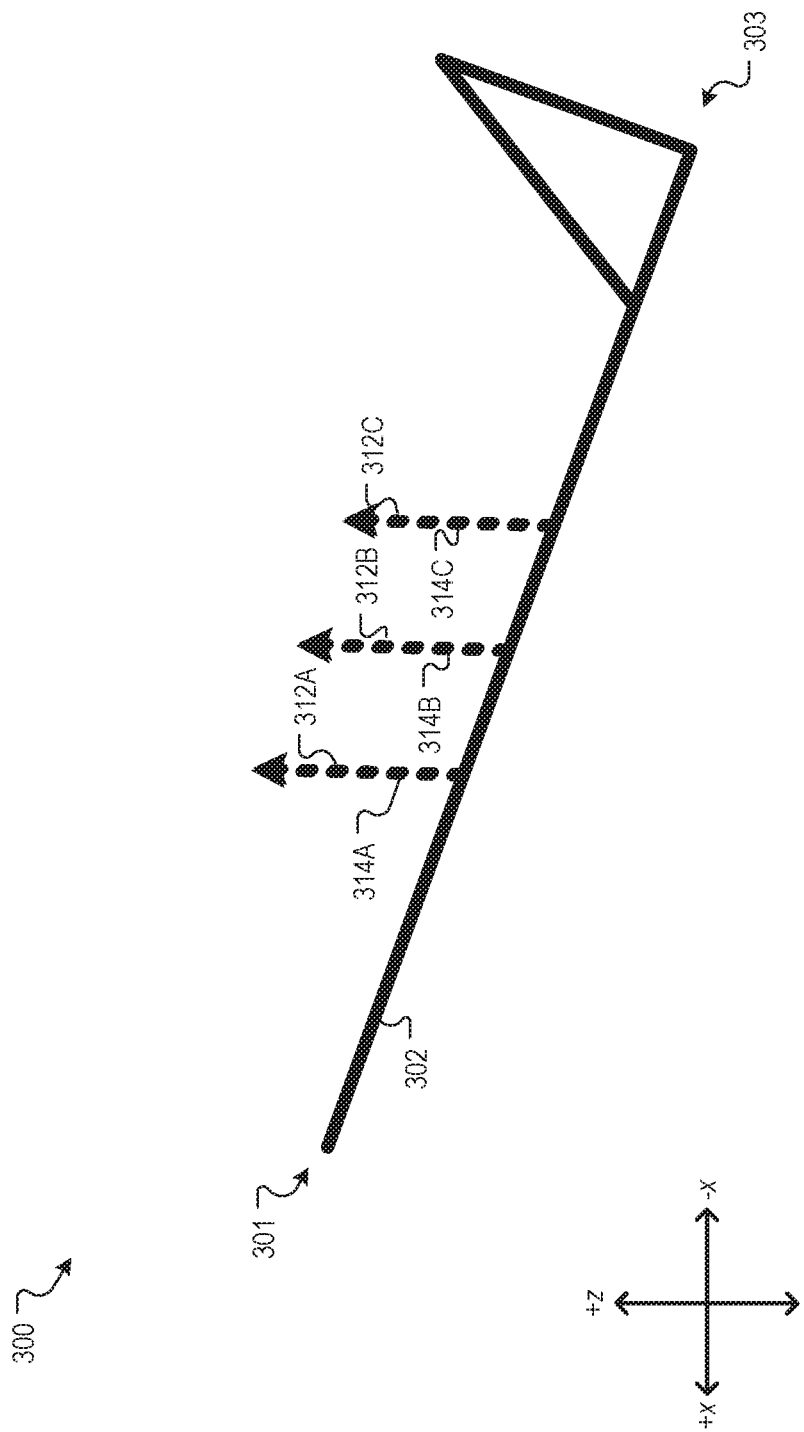
FIG. 5 is a diagram showing an example of the aerial vehicle of FIG. 3 with the likable rotors tilted towards the nose end of the aerial vehicle and the fuselage pitched upward and not parallel to the horizon.

FIG. 5 is a simplified diagram showing an example of the aerial vehicle 300 of FIG. 3 with the tiltable rotors tilted towards the nose end 301 of the aerial vehicle and the fuselage 302 pitched upward and not parallel to the horizon, which, as in FIGS. 3 and 4, is indicated by the x-axis. The aerial vehicle 300 may transition from the attitude shown in FIG. 4 to the attitude shown in FIG. 5, for example, by increasing the motor speed (and thus the thrust) generated by the rotors 308A, 310A positioned nearer to the nose end 301 of the aerial vehicle 300 and/or by decreasing the speed (and therefore the thrust) of the rotors 308C, 310C positioned nearer to the tail end 303 of the aerial vehicle. The aerial vehicle 300 may be also be capable of descending and ascending with the fuselage 302 non-parallel to the horizon. In this way, the aerial vehicle 300 may be capable of taking off or landing on a surface that is not parallel to the horizon, such as an incline, an inclined roof, a vehicle roof or similar platform, etc.

Figure 6:
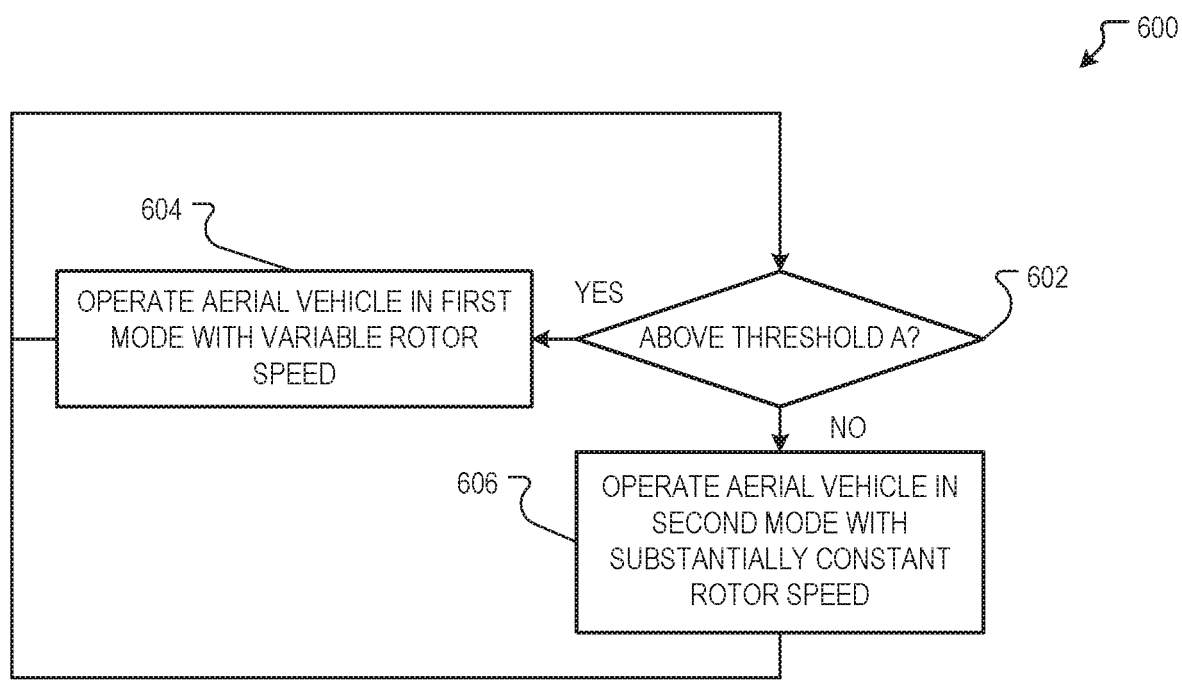
FIG. 6 is a flowchart showing one example of a process flow that can be performed by an avionics system of an aerial vehicle to operate in different altitude-dependent modes.

FIG. 6 is a flowchart showing one example of a process flow 600 that can be performed by an avionics system of an aerial vehicle, such as by the avionics system 100 described herein, to operate in different altitude-dependent modes. At operation 602, the avionics system determines if the aerial vehicle is above a threshold altitude. If the aerial vehicle is above the threshold altitude, then the avionics system operates the aerial vehicle in a first mode, at operation 604, that utilizes variable rotor speeds. For example, in the first mode, the avionics system 100 may utilize differential changes to rotor speed in addition to or instead of rotor tilts to generate moments of torque to change the attitude of the aerial vehicle. If the aerial vehicle is not above the threshold altitude, then the avionics system 100 operates the aerial vehicle in a second mode, at operation 606. In the second mode, rotor speed is substantially constant. For example, all of the rotors may be operated at the same speed and attitude changes to the aerial vehicle may be made utilizing the tilt control system and tiltable rotors.

The threshold altitude may be selected to be above a range where humans on the ground can hear the aerial vehicle or are likely to be bothered by the vehicle's noise. For example, when the speed of the aerial vehicle's rotors changes, the pitch of the noise made by the rotor and its motor also changes. On the other hand, when the speed of the rotors is substantially constant, the pitch of the sound generated by the rotors and motors is also substantially constant. Because human perception is attuned to detect changes in pitch, the aerial vehicle may be more noticeable (and more of a nuisance to nearby humans) when operating in the first mode with variable rotor speed. Accordingly, operating the aerial vehicle in the second mode with substantially constant rotor speed when the aerial vehicle is below the threshold altitude may allow the aerial vehicle to operate when less nuisance to humans and other sound-sensitive applications on the ground.

Figure 7:
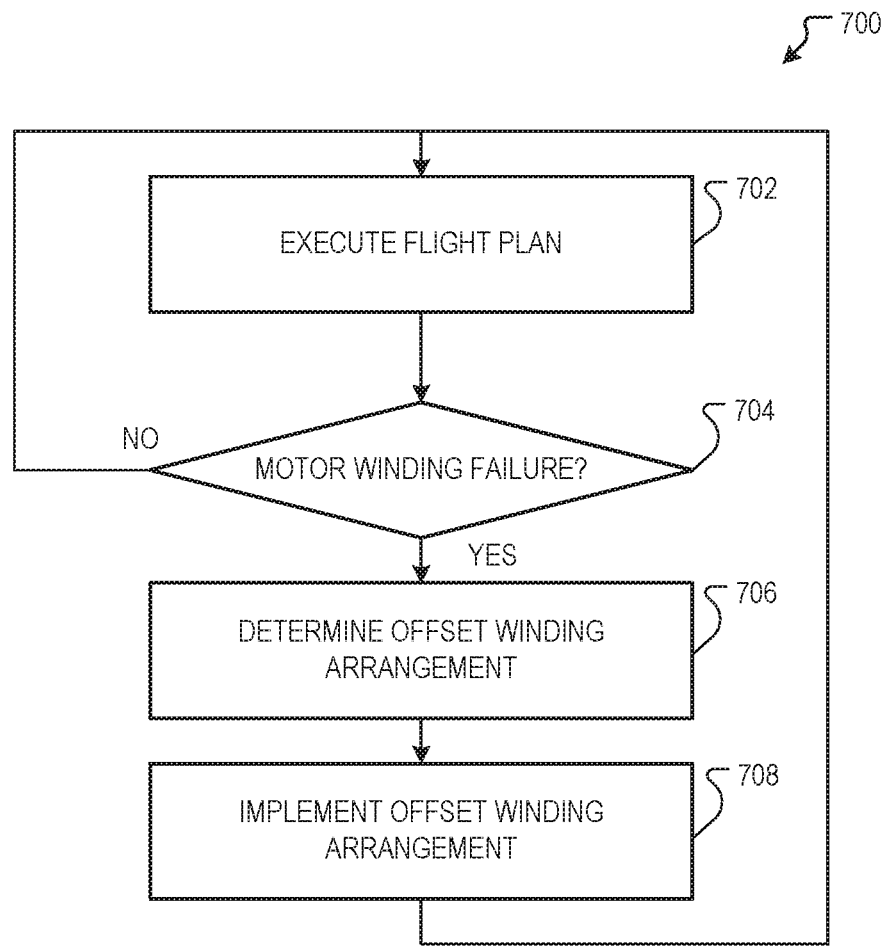
FIG. 7 is a flowchart showing one example of a process flow that can be executed by an avionics system of an aerial vehicle to compensate for one or more motor winding failures.

FIG. 7 is a flowchart showing one example of a process flow 700 that can be executed by an avionics system of an aerial vehicle, such as by the avionics system 100 described herein, to compensate for one or more motor winding failures. At operation 702, the avionics system 100 executes a flight plan for the aerial vehicle. The flight plan may describe, for example, a takeoff point, a landing point and, optionally, one or more waypoints. The avionics system 100 executes the flight plan, for example, as described herein with respect to FIG. 2.

At operation 704, the avionics system 100 determines if there has been a motor winding failure. A motor winding failure may include a failure of the motor winding itself and/or of the motor controller at the motor control system 108 that drives the motor winding. If no motor winding failure has occurred, the avionics system 100 continues to execute the flight plan at operation 702. If a motor winding failure has occurred at a motor, the avionics system 100 determines an offset winding arrangement at operation 706. The offset winding arrangement may include modifying the thrust command to one or more remaining operational windings at the motor. For example, if one winding at the motor fails, the avionics system 100 may increase the thrust requested at the remaining windings (e.g., by increasing the provided current). Also, in some examples, the offset winding arrangement may include disabling a motor winding and/or reducing the thrust requested at a motor or motor winding corresponding to the failed winding. For example, referring to FIG. 3 as an example, if a motor winding driving the rotor 308A fails, the offset winding arrangement may include disabling one winding of the motor driving the rotor 310A. Disabling and/or reducing the thrust requested at a corresponding motor winding may occur, for example, if the remaining operational windings at a motor cannot achieve sufficient thrust to offset the loss of the failed winding.

At operation 708, the avionics system 100 implements the offset winding arrangement. For example, the avionics system 100 may generate configurations of the tiltable rotors to generate moments of torque and/or thrust vectors for the aerial vehicle considering the offset winding arrangement.

Figure 8:
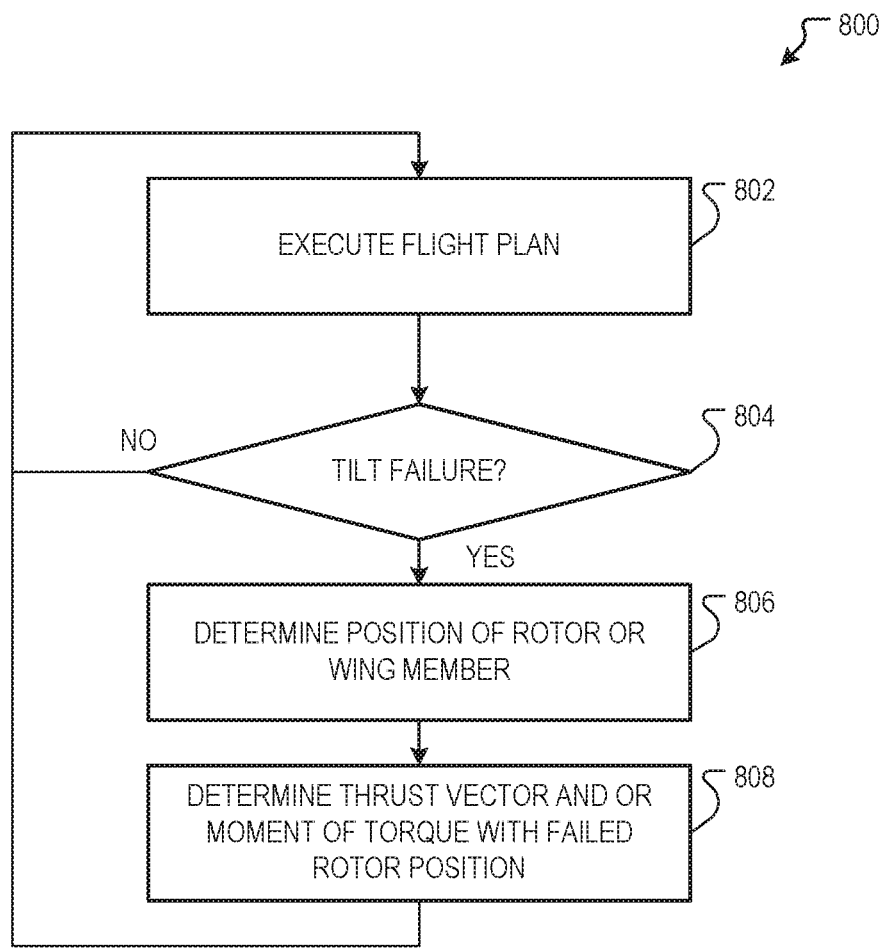
FIG. 8 is a flowchart showing one example of a process flow that can be executed by an avionics system of an aerial vehicle to compensate a failure of a tilt control system component.

FIG. 8 is a flowchart showing one example of a process flow 800 that can be executed by an avionics system of an aerial vehicle, such as by the avionics system 100 described herein, to compensate a failure of a tilt control system 110 component. At operation 802, the avionics system 100 executes a flight plan for the aerial vehicle. The flight plan may describe, for example, a takeoff point, a landing point and, optionally, one or more waypoints. The avionics system 100 executes the flight plan, for example, as described herein with respect to FIG. 2.

At operation 804, the avionics system 10 determines if a tilt failure has occurred. A tilt failure occurs, for example, if the tilt control system 110 is not able to control the tilt of one or more of the rotors 114A, 114B, 114C, 114D, 114E, 114F. This can occur, for example, if a motor or another part of the drivetrain positioned to tilt a wing member 116A, 116B is not responsive. In some examples, the drivetrain to tilt the wing members 116A, 116B may have a gear ratio that is selected such that aerodynamic forces on the wing members 116A, 116B during normal flight do not cause the wing members 116A, 116B to rotate absent input from the tilt control system 110. Accordingly, upon a tilt failure of one wing member 116A, 116B, the failed wing member 116A, 116B may remain stationary. If no tilt failure has occurred, the avionics system continues to execute the flight plan at operation 802.

If a tilt failure is detected at operation 804, the avionics system 100 determines a position of the failed rotor and/or wing member at operation 806. This can be done in various suitable ways. In some examples, the position of the failed rotor or wing member is the last known position of the rotor or wing member 116A, 116B. In other examples, the sensors 112 may include one or more sensors that generate a signal based on the position of the rotors or wing members 116A, 116B. In still other examples, the tilt control system 110 may utilize a stepper motor to tilt the wing members 116A, 116B. The current position of the stepper motor may indicate the current position of the rotors on the failed wing member 116A, 116B.

At operation 808, the avionics system determines a thrust vector and/or moment of torque for the aerial vehicle with the failed rotor position. For example, if the wing member 116A is failed at a first position, the avionics system may find a combination of rotor speeds for the rotors 114A, 114B, 114C, 114D, 114E and tilt positions for the operational wing member 116B that bring about a desired thrust vector and/or moment of torque. The avionics system may continue to execute the flight plan at operation 802.

FIGS. 9-19 are diagrams showing various embodiments of an example aerial vehicle 900 that may be controlled by an avionics system, such as the avionics system 100 described herein. The aerial vehicle 900 comprises a fuselage 902 and tiltable wing members 904, 906. The fuselage comprises a nose end 901 and a tail end 903. A fuselage rotation axis 905 and a wing member rotation axis 907 are also shown. At the tail end 903, the fuselage 902 comprises stabilizers 920, 922, 924. Stabilizer 920 may be a vertical stabilizer. In the example shown in FIG. 9, stabilizers 922, 924 are positioned in an anhedral arrangement with the tips of the stabilizers 922, 924 away from the vertical stabilizer 920. In some examples, the tail of the aerial vehicle, including stabilizers 920, 922, 924, is stationary. For example, the stabilizers 920, 922, 924 may not be movable and may not include movable control surfaces. The wing members 904, 906, as shown, are positioned in a dihedral arrangement with the tips of the wing members 904, 906 towards the stabilizer 922. Wing member 904 includes rotors 908A, 908B, 908C that are driven by motors positioned at respective nacelles 930A, 930B, 930C. Wing member 906 includes rotors 910A, 910B, 910C driven by motors positioned at respective nacelles 932A, 932B, 932C.

Figure 9:
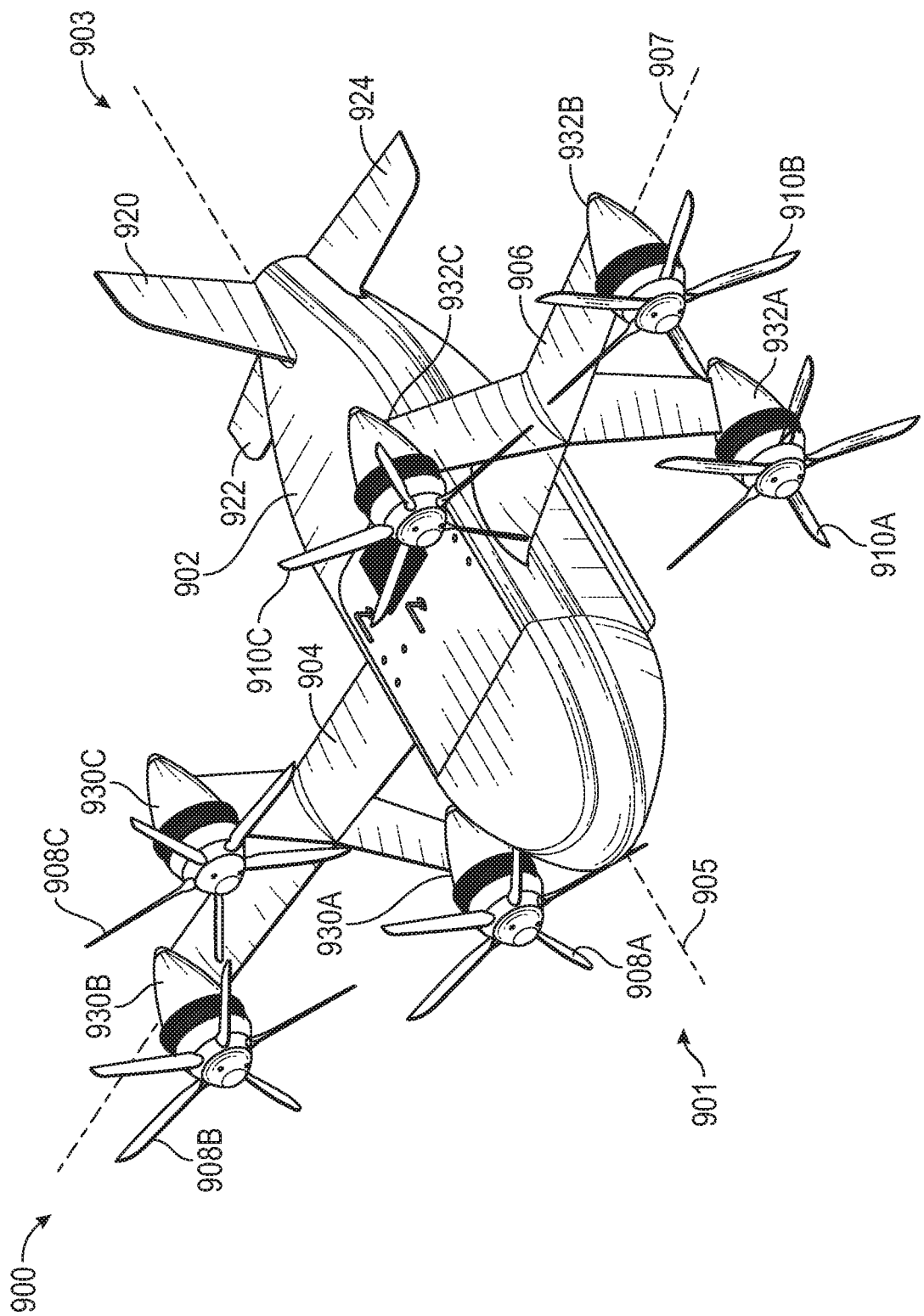
FIGS. 9-19 are diagrams showing various embodiments of an example aerial vehicle that may be controlled by an avionics system.

In the example of FIG. 9, the aerial vehicle 900 is arranged for horizontal flight with the wing members 906 tilted to orient the rotor vectors of the rotors 908A, 908B, 908C, 910A, 910B, 910C towards the nose end 901.

Figure 10:
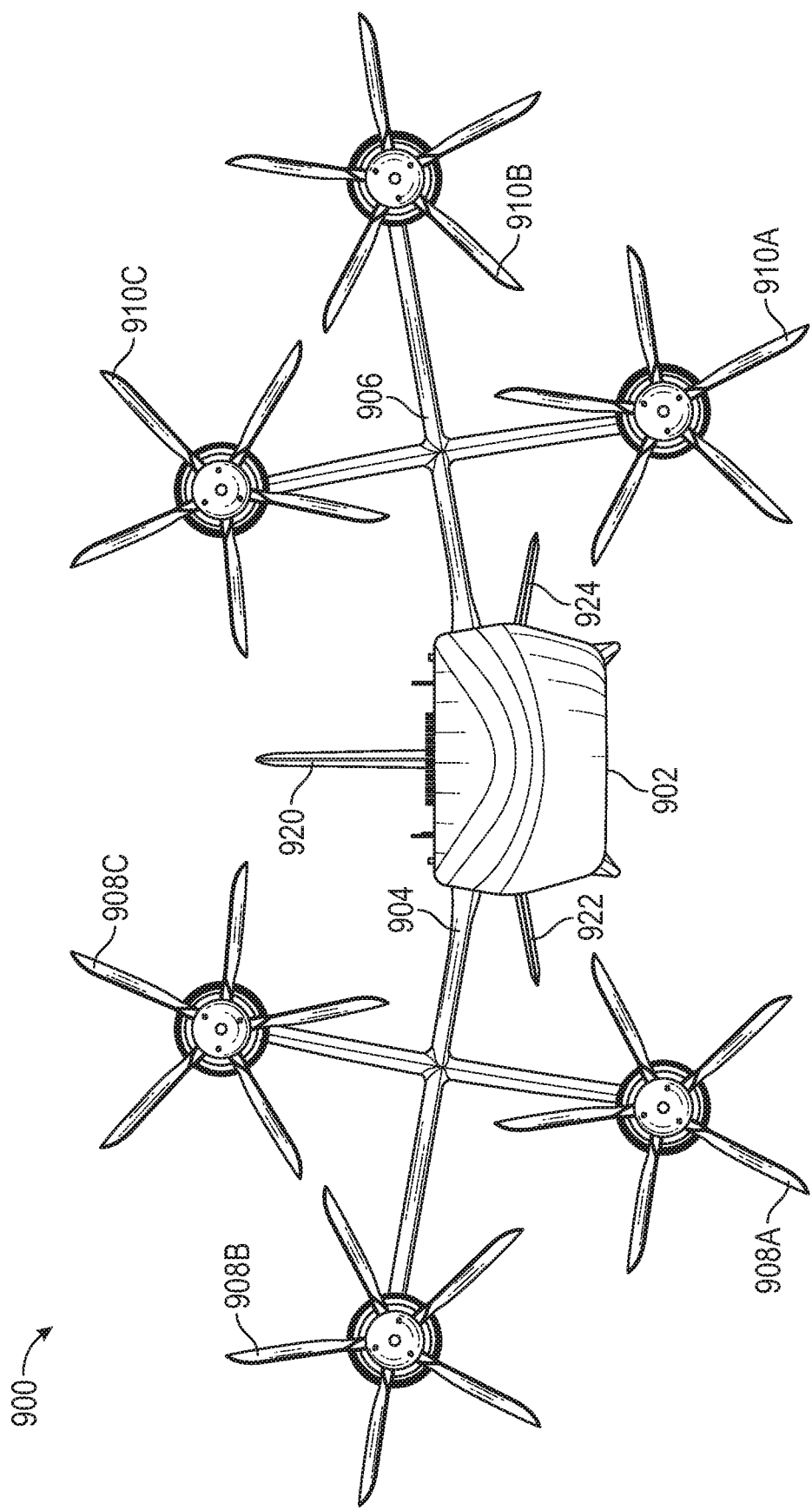
Figure 11:
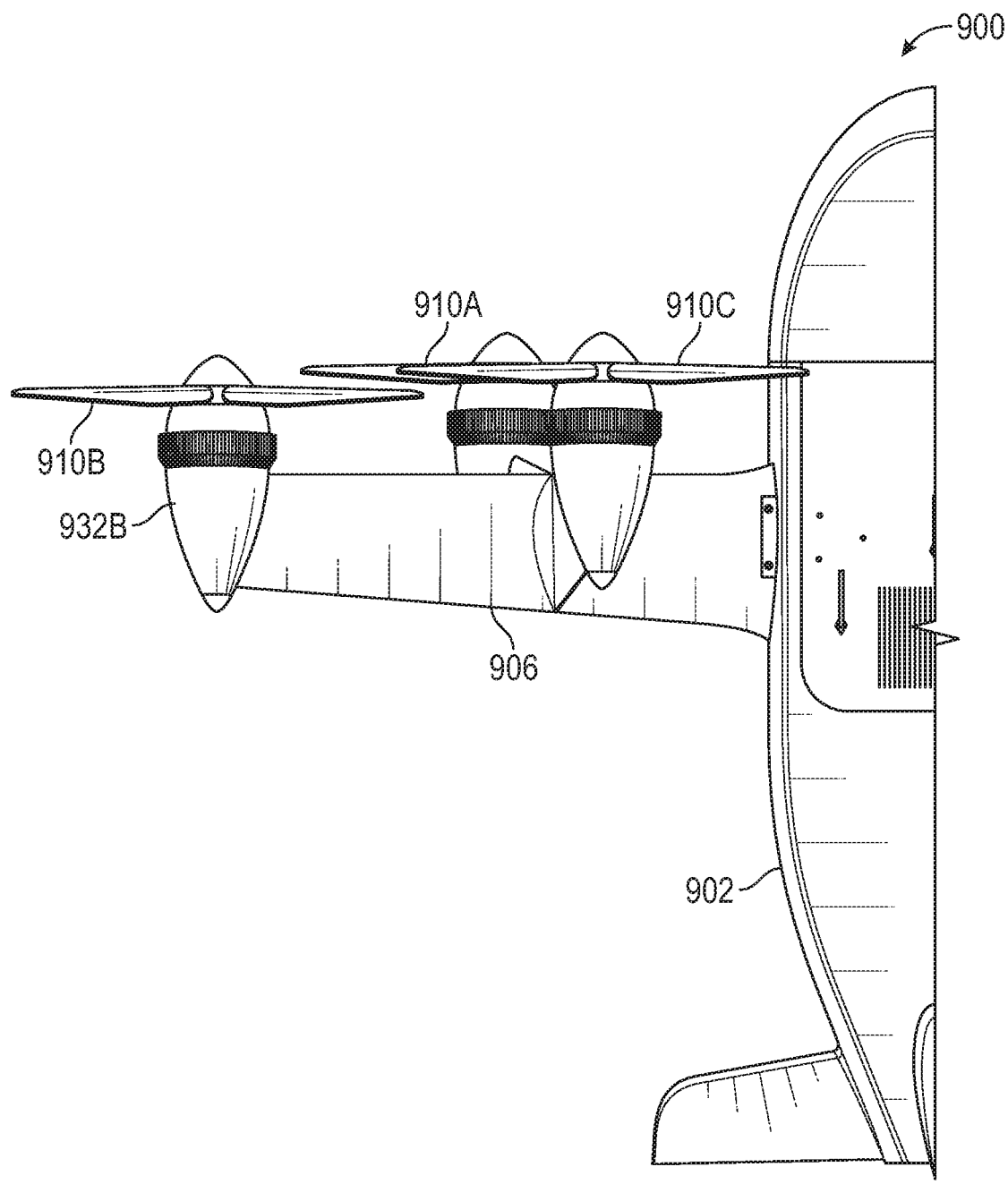

FIG. 10 is a head-on view of the aerial vehicle 900 in the arrangement of FIG. 9. FIG. 10 illustrates the anhedral arrangement of the stabilizers 922, 924 and the dihedral arrangement of the wing members 904, 906. FIG. 11 is a top down view of a top, left side of the aerial vehicle 900 in the arrangement of FIG. 9.

Figure 12:
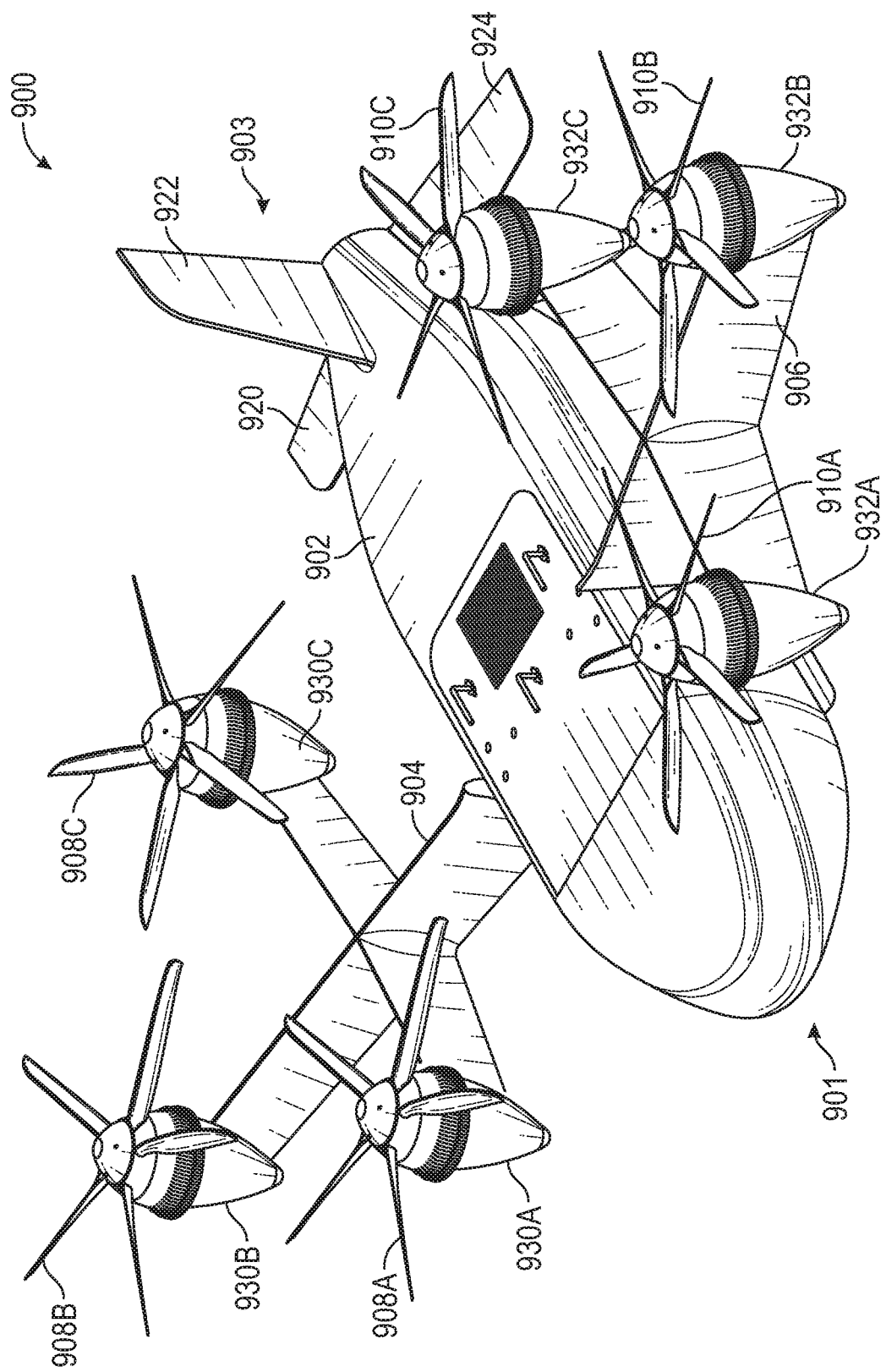

FIG. 12 is a perspective view of the aerial vehicle 900 in the arrangement of FIG. 9. In the example of FIG. 12, the wing members are tilted to orient the rotor vectors of the rotors 908A, 908B, 908C, 910A, 910B, 910C upwards for vertical flight, such as takeoff or landing.

Figure 13:
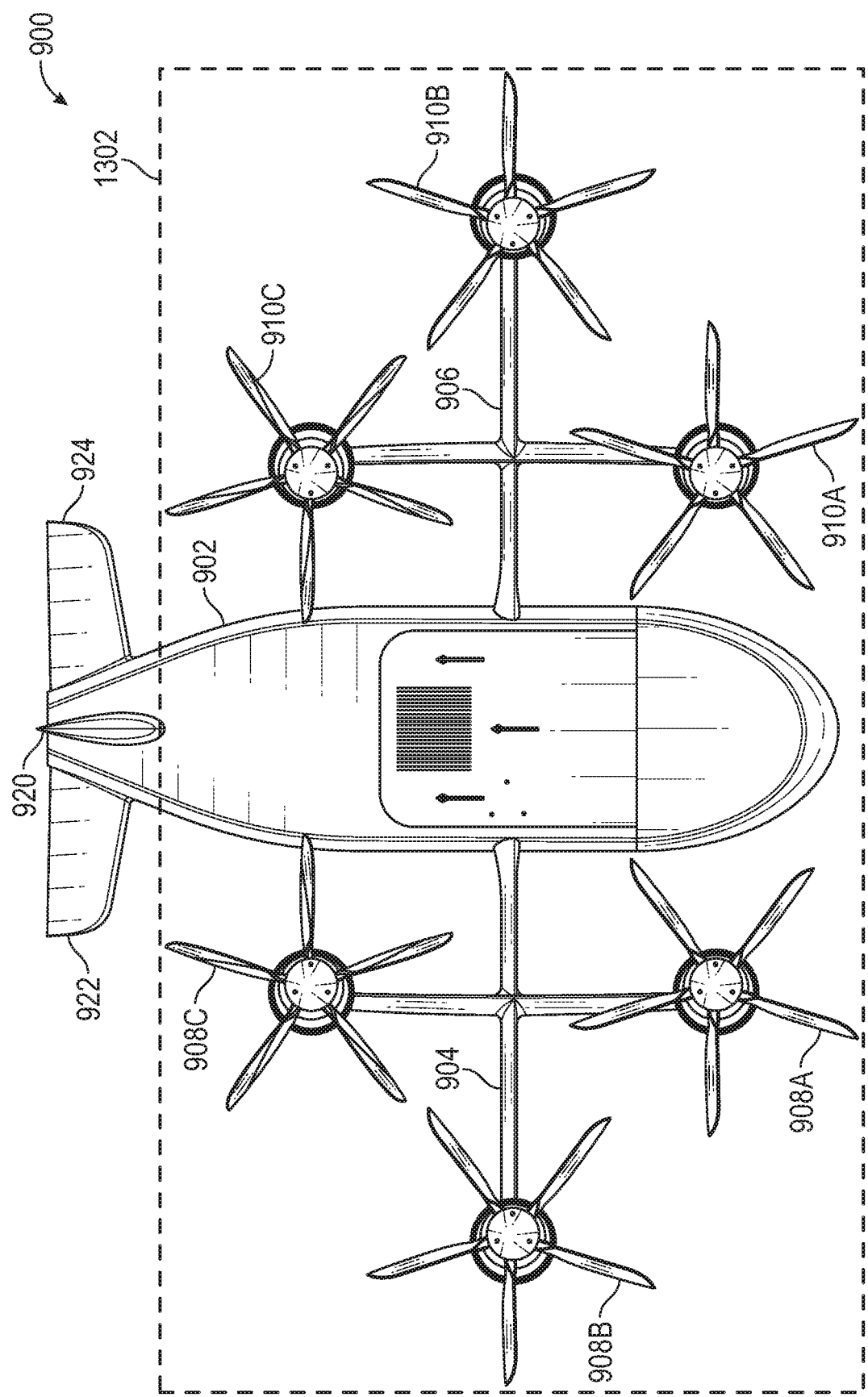
Figure 14:
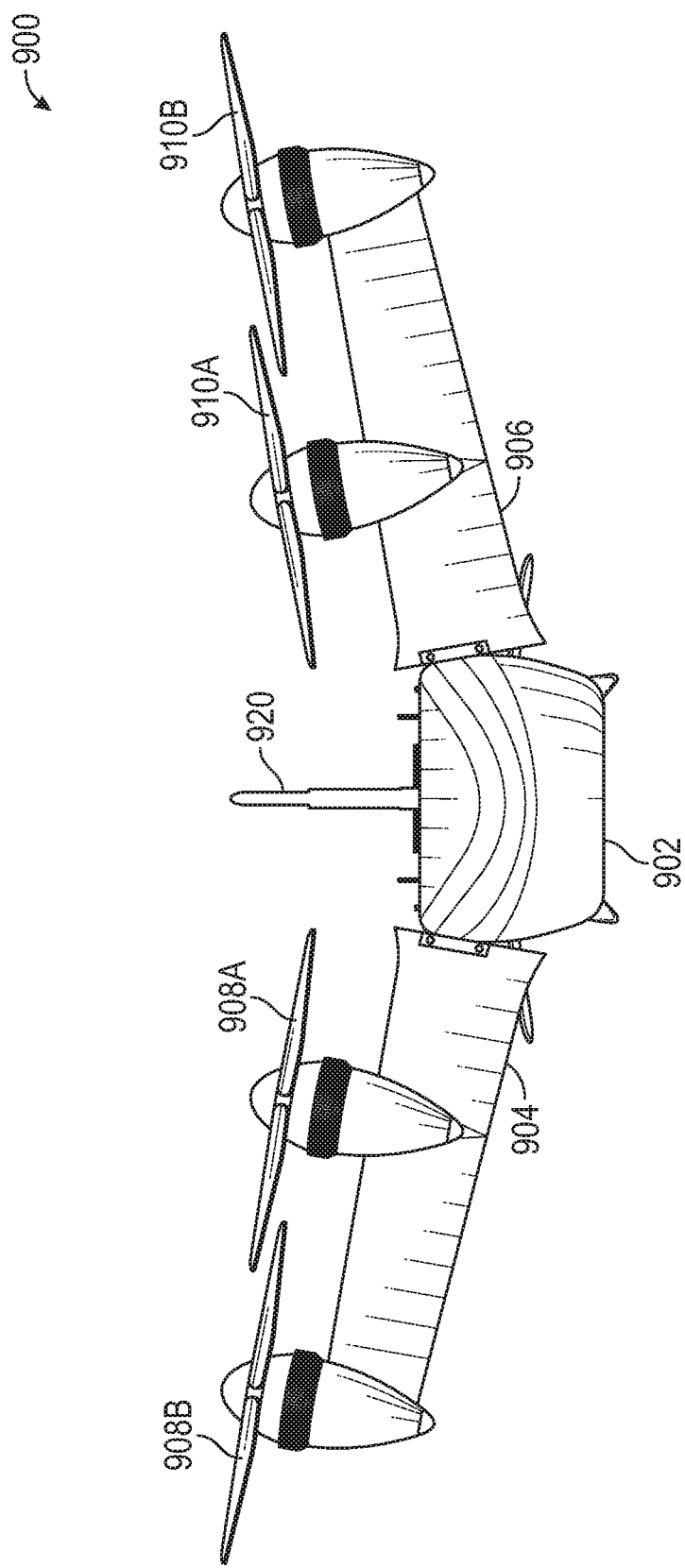
Figure 15:
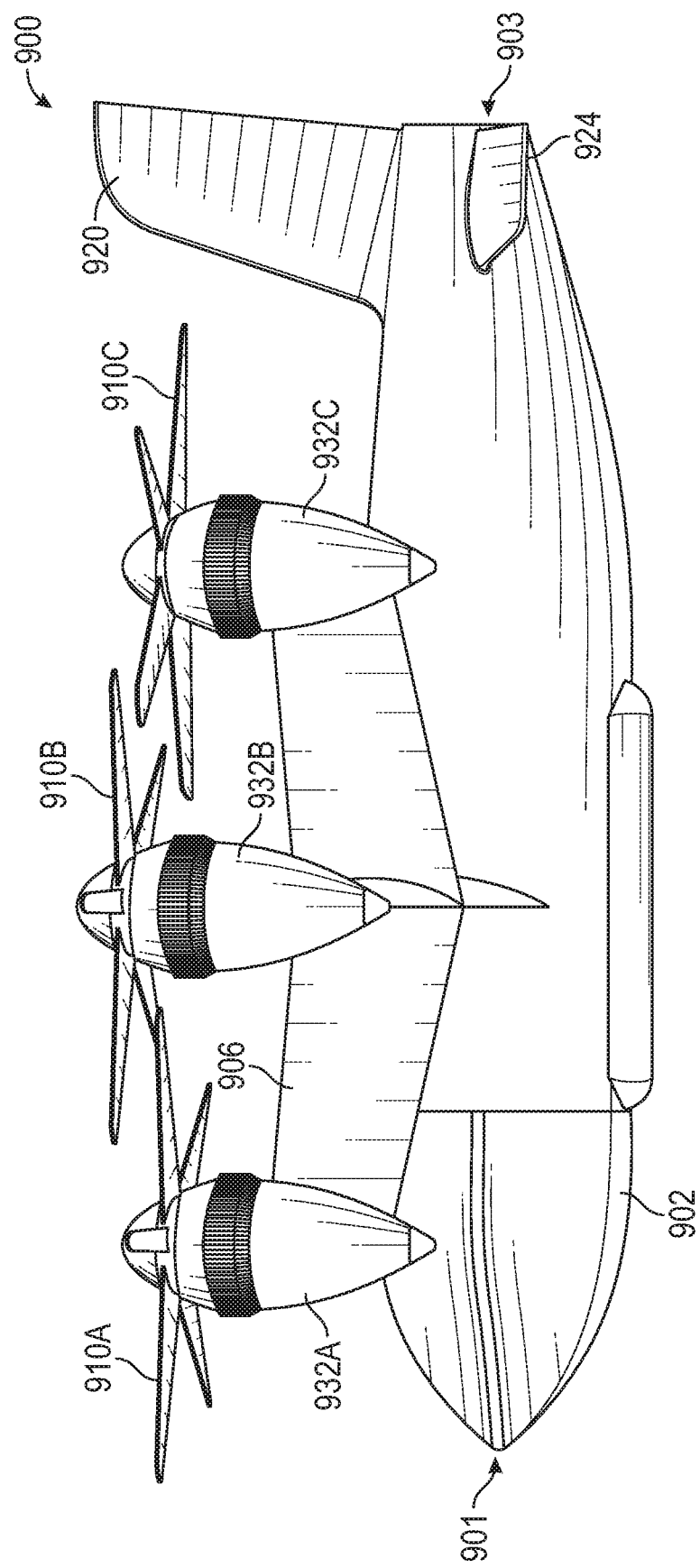
Figure 16:
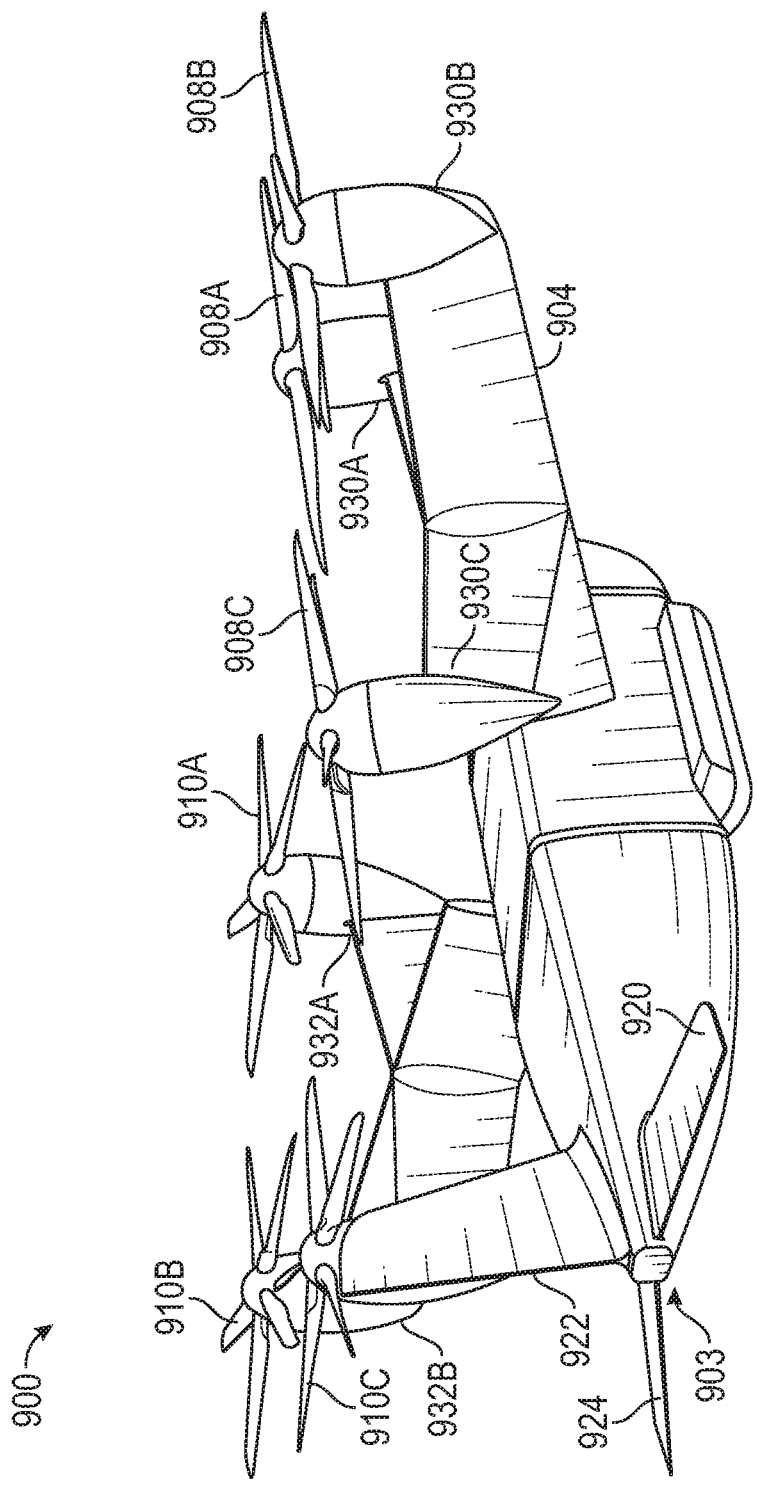

FIG. 13 is a top-down view of the aerial vehicle 900 in the arrangement of FIG. 12. FIG. 14 is a head-on view of the aerial vehicle in the arrangement of FIG. 12. FIG. 15 is a left-side view of the aerial vehicle 900 in the arrangement of FIG. 12. FIG. 16 is a right-rear view of the aerial vehicle 900 in the arrangement of FIG. 12. FIG. 13 illustrates the disk loading of the example aerial vehicle 900. The rotors 908A, 908B, 908C, 910A, 910B, 910C are positioned within an area indicated by bounding box 1302. The six rotor arrangement illustrated may maximize the rotor area within the bounding box. Also, as show, the rotors 908A, 908B, 908C, 910A, 910B, 910C are positioned so as to avoid obstructions to the rotor downwash and without disk overlap between rotors 908A, 908B, 908C, 910A, 910B, 910C. This may also reduce the noise generated by the aerial vehicle 900.

Figure 17:
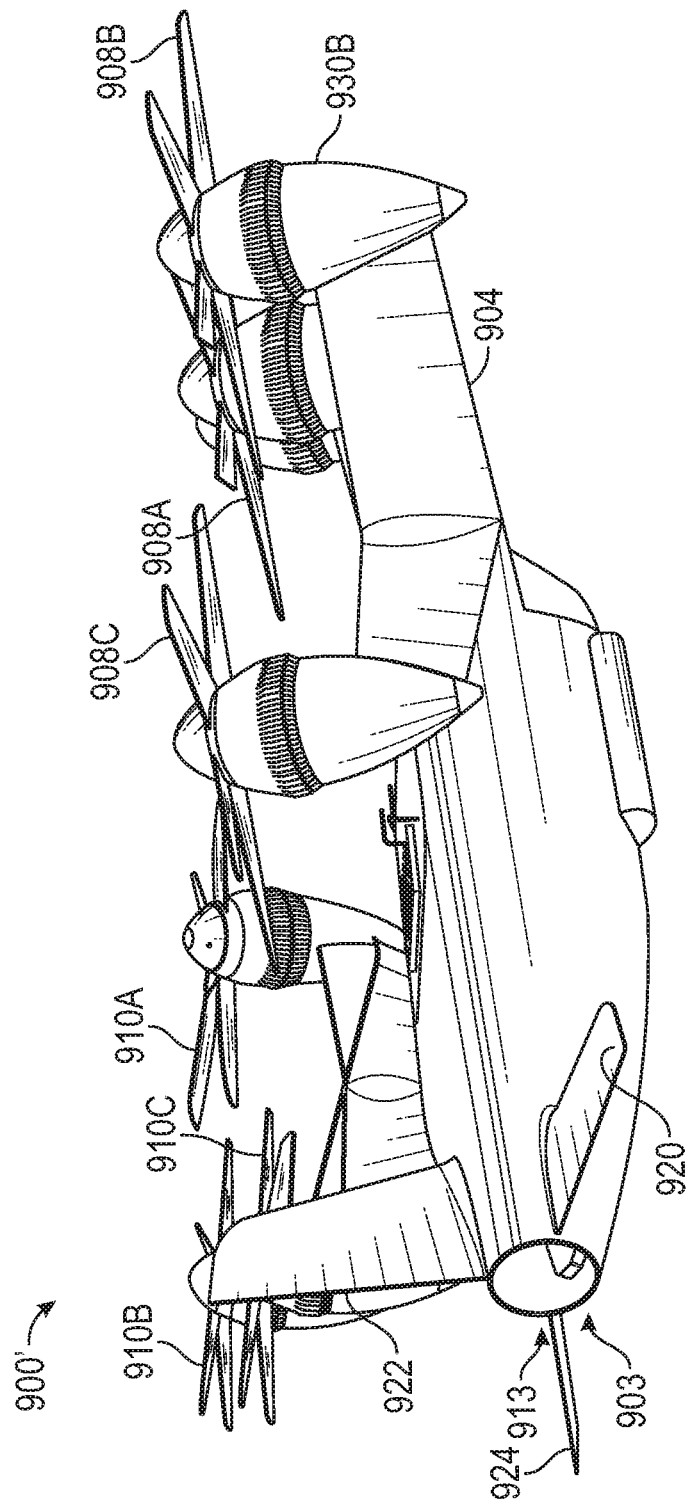

FIG. 17 is a right-rear view of an alternate arrangement of the aerial vehicle 900' including an opening 913 for receiving an emergency parachute. The avionics system 100 may be configured to deploy the emergency parachute from the opening 913, for example, in the event of an unrecoverable failure.

Figure 18:
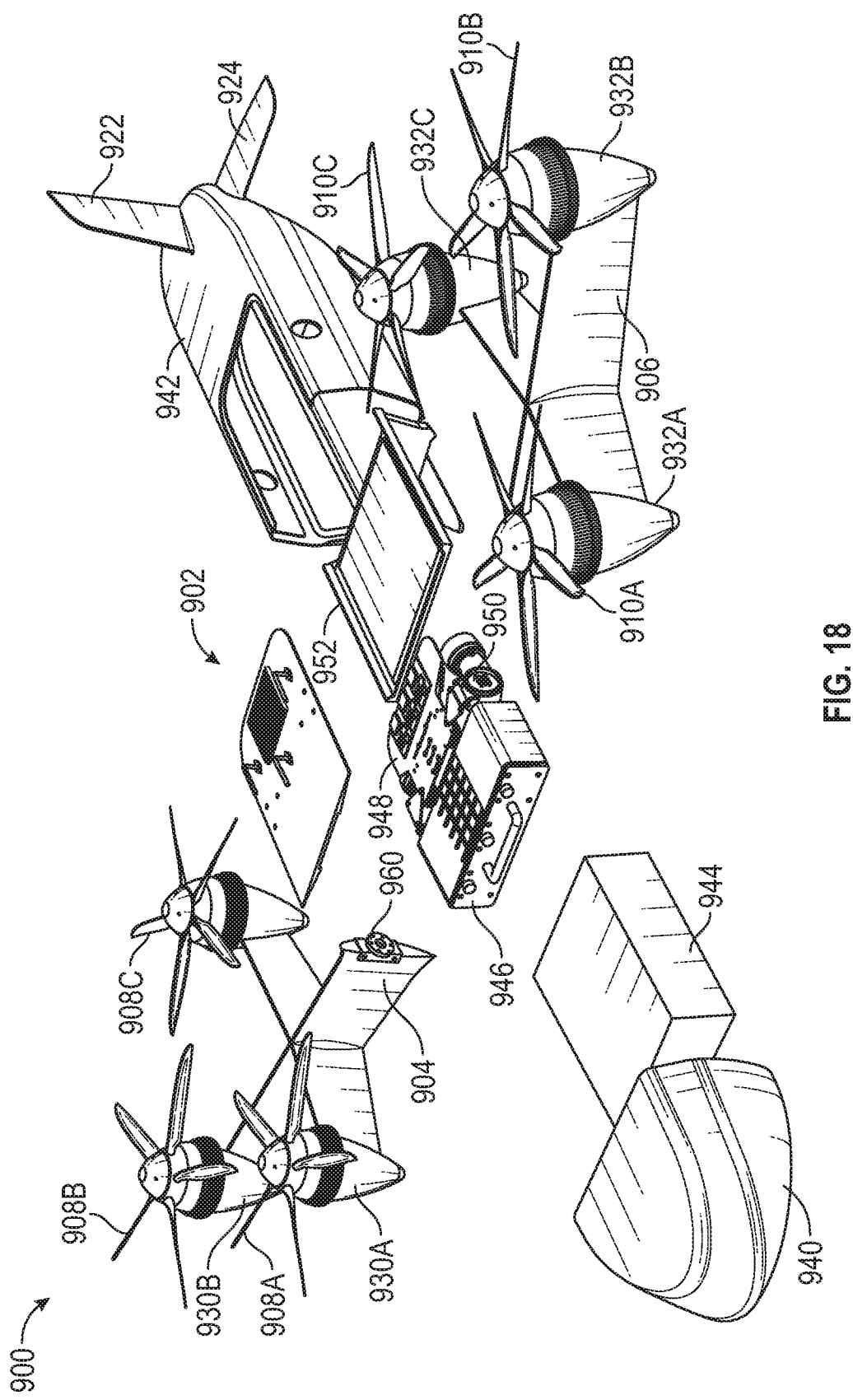

FIG. 18 is an exploded view of one example of the aerial vehicle 900. In this example, the fuselage 902 comprises a nose portion 940 that house a battery 944 and a tail portion 942, an avionics system 946, motor control board 948, and wing rotation mechanism 950. A cargo tray 952 is positioned over battery 944, avionics system 946, motor control board 948, and wing rotation mechanism 950 and provides space for cargo on top of and behind these components. FIG. 18 also shows a view of the wing member 904 illustrating a mounting point 960 where the wing member 904 mounts to the wing rotation mechanism 950.

Figure 19:
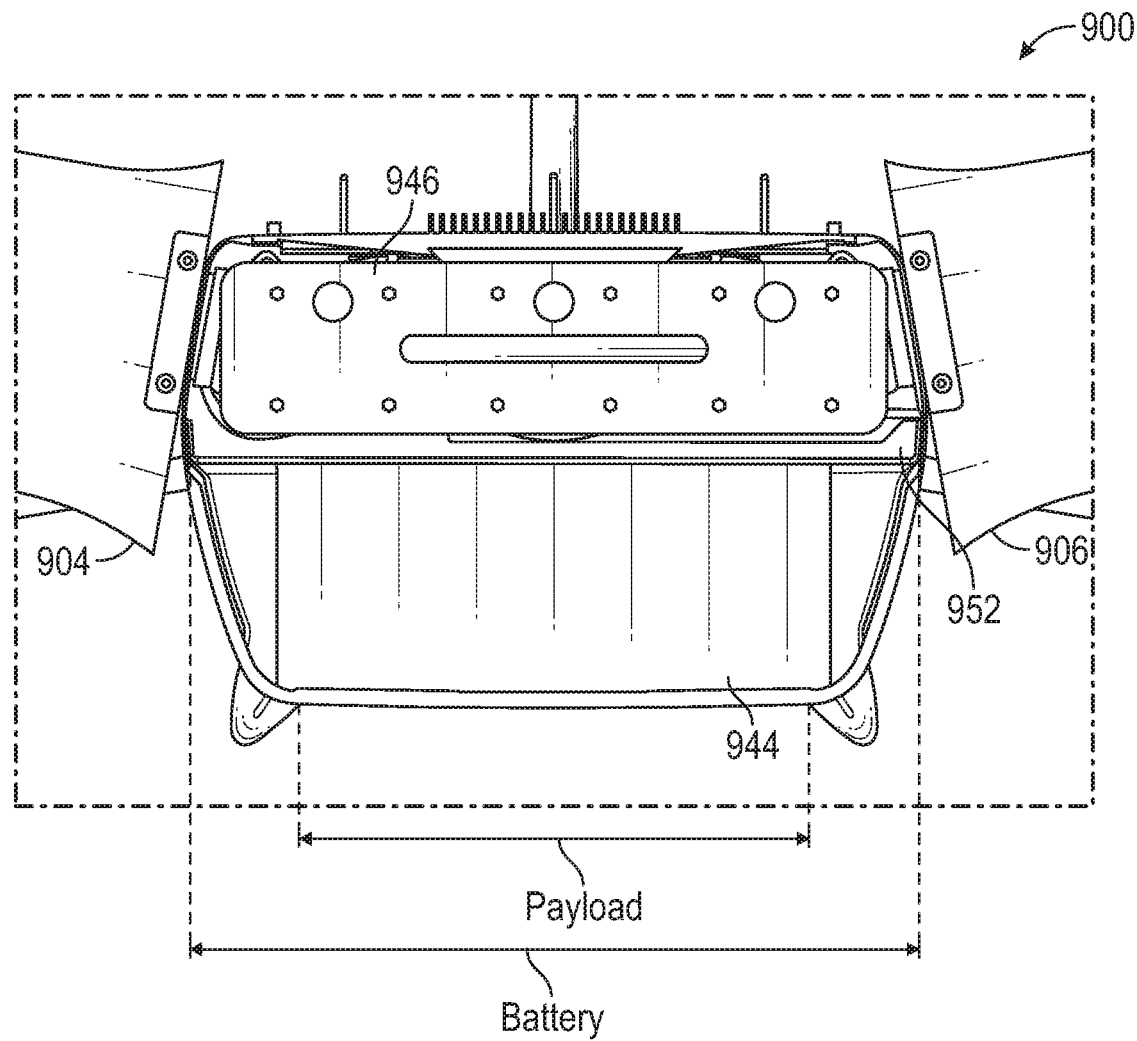

FIG. 19 shows a cross-sectional view of the aerial vehicle 900 showing the placement of the battery 944, avionics system 946, and cargo tray 952 in the fuselage 902.

Figure 20:
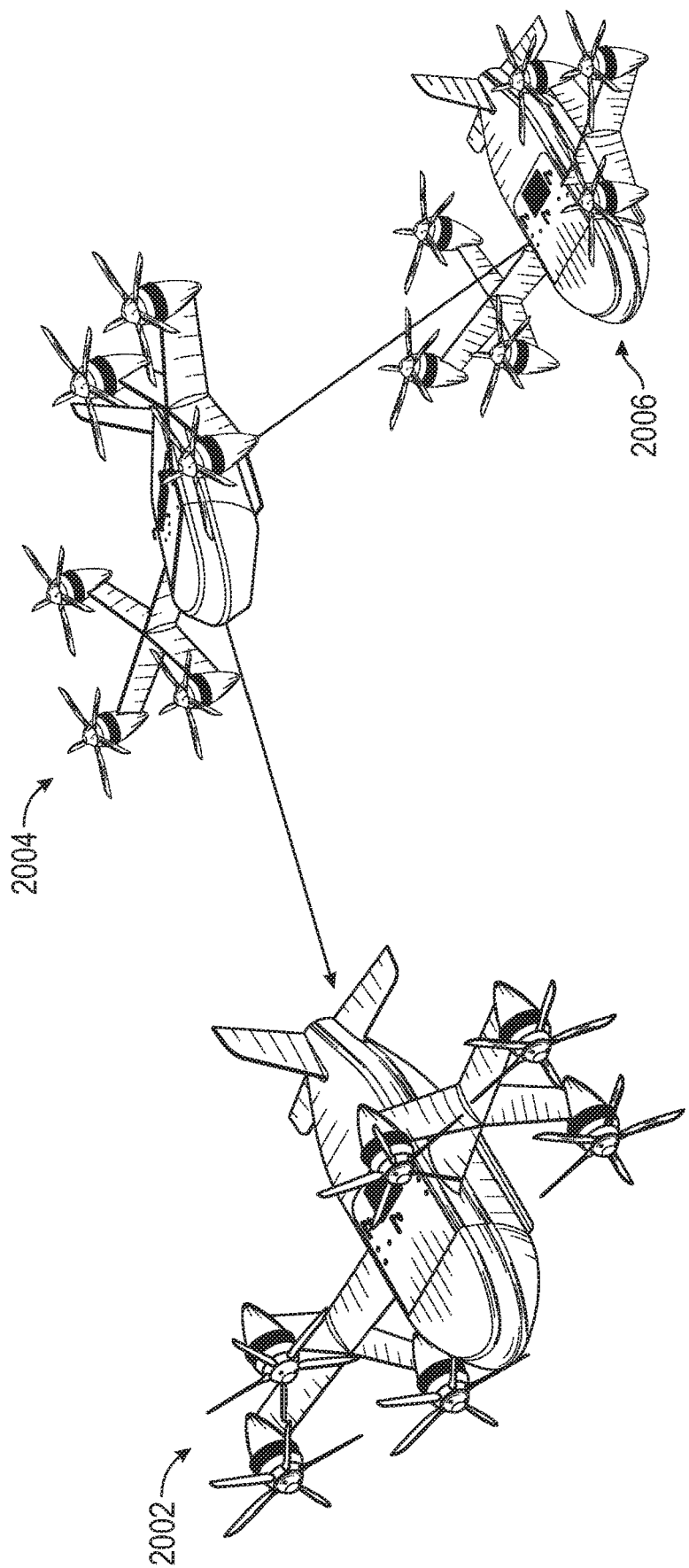
FIG. 20 is a diagram illustrating a progression of the aerial vehicle of FIGS. 9-19 from a vertical take-off to horizontal flight.

FIG. 20 is a diagram illustrating a progression of the aerial vehicle 900 from a vertical take-off to horizontal flight. At view 2006, the aerial vehicle 900 has its wing members 904, 906 tilted such that the rotor vectors are directed up. At view 2004, the aerial vehicle 900 is oriented with the wing members 904, 906 tilted between an upward direction and a forward direction (e.g., towards the nose end). At view 2002, the aerial vehicle is oriented with the wing members 904, 906 tilted for horizontal flight.

Figure 21:
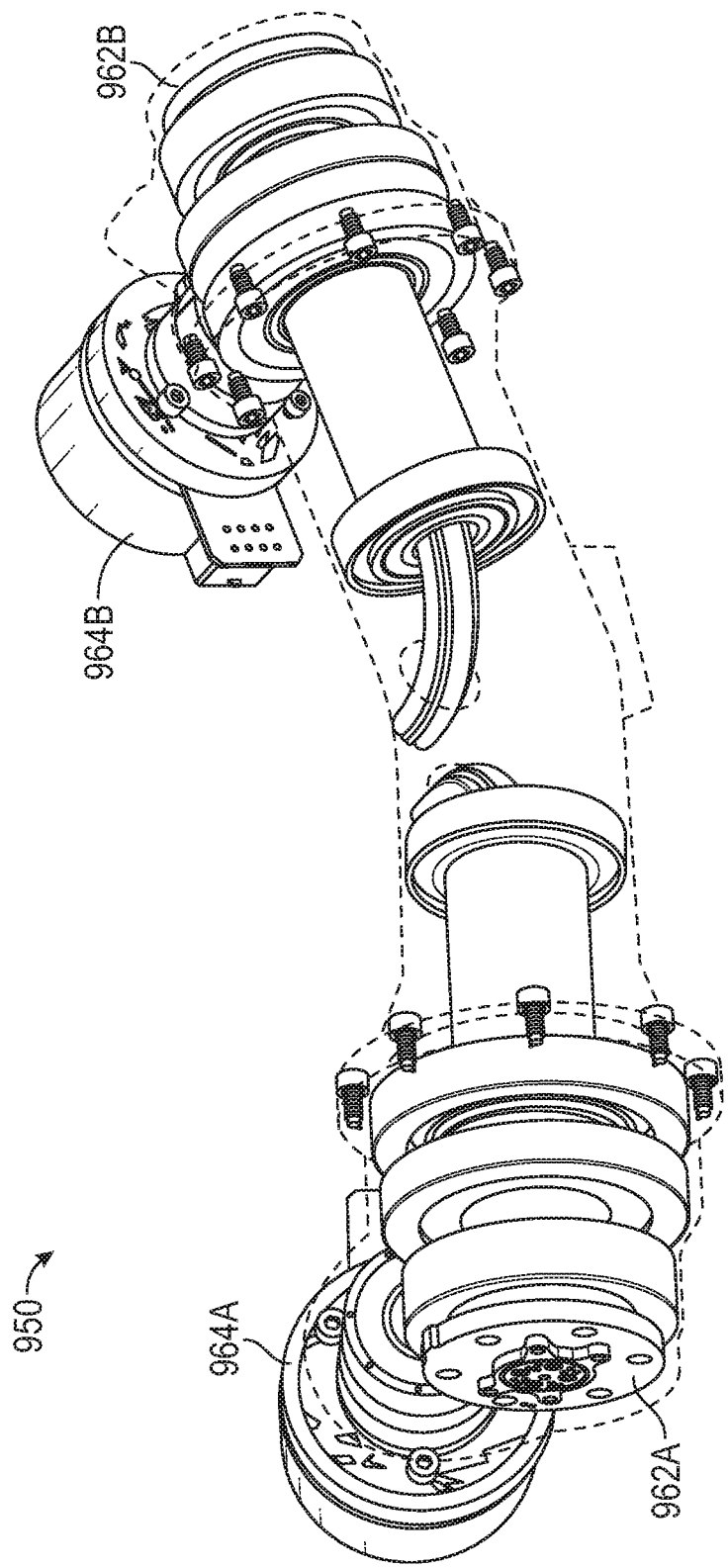
FIGS. 21 and 22 are diagrams showing another view of the wing rotation mechanism.

FIG. 21 shows another view of the wing rotation mechanism. For example, the mounting point 960 of the wing member 904 mounts to the coupling 962A shown in FIG. 21. The wing member 906 mounts to a coupling 962B. Motors 964A, 964B are actuated by the avionics system to tilt the wing members 904, 906.

Figure 22:
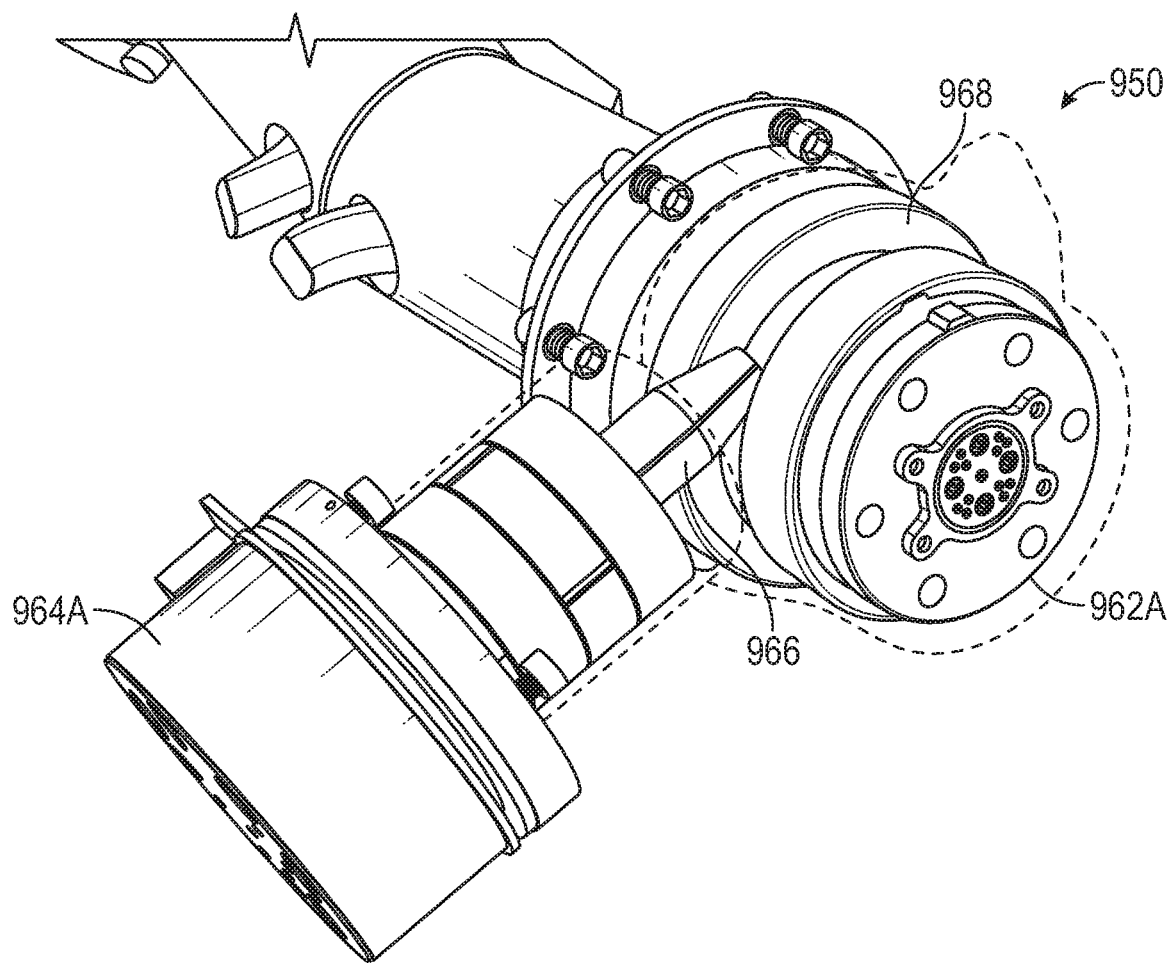

FIG. 22 shows another view of the wing rotation mechanism 950 showing the motor 964A and coupling 962A for coupling to the mounting point 960. The motor 964A comprises a bevel gear 966 that rotates when the motor is actuated to cause rotation of a second bevel gear 968. The bevel gear 968 is coupled to the coupling 962A. In some examples, the gear ratio of the bevel gears 966, 968 may be low enough to prevent the wing member 904 from moving in the event of failure of the motor 964A or another component for controlling the wing member 904.

Figure 23:
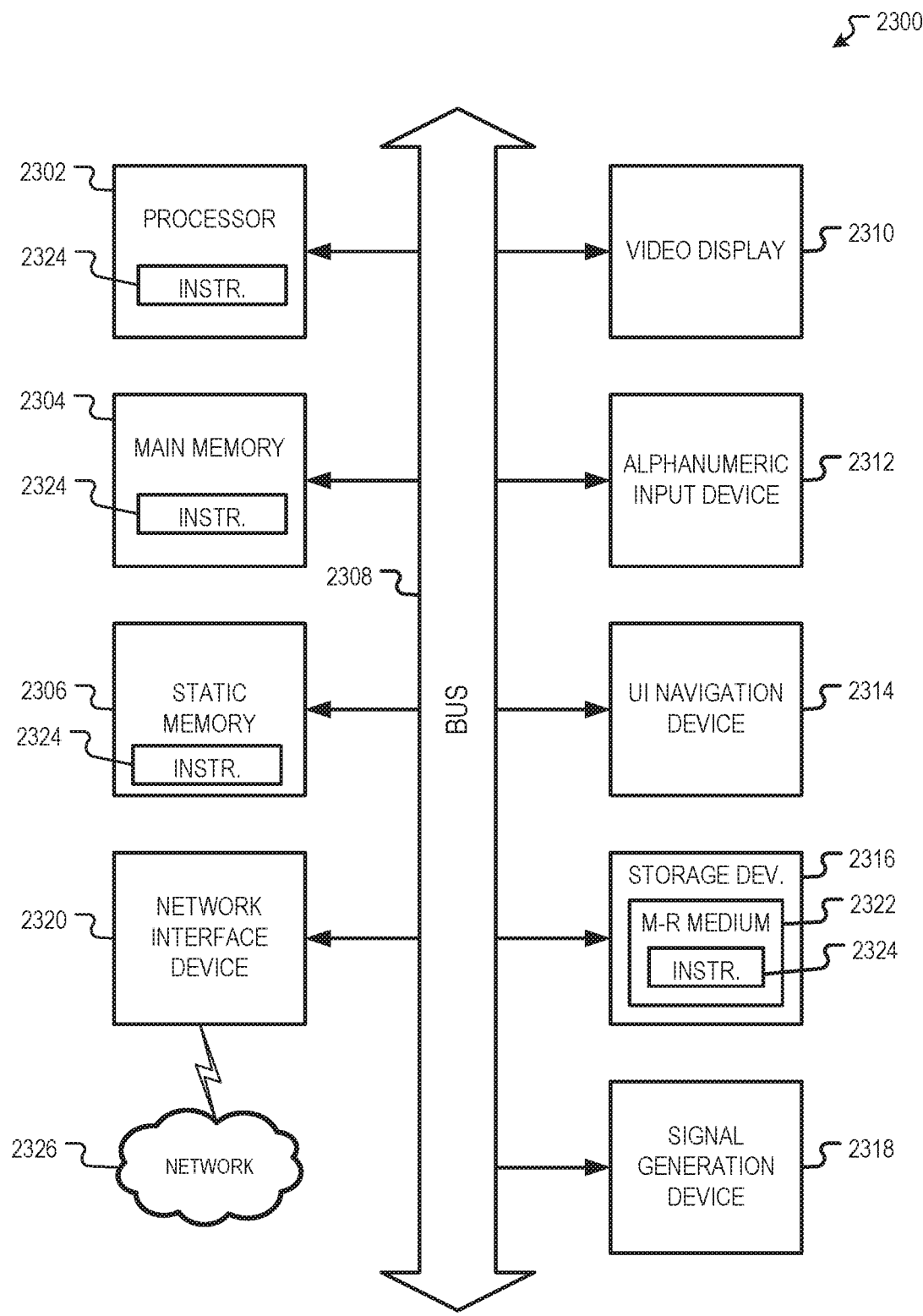
FIG. 23 is a block diagram illustrating a computing device hardware architecture within which a set or sequence of instructions can be executed to cause a machine to perform examples of any one of the methodologies discussed herein.

FIG. 23 is a block diagram illustrating a computing device hardware architecture 2300, within which a set or sequence of instructions can be executed to cause a machine to perform examples of any one of the methodologies discussed herein. The hardware architecture 2300 describes a computing device for executing the vehicle autonomy system, described herein.

The architecture 2300 may operate as a standalone device or may be connected (e.g., networked) to other machines. In a networked deployment, the architecture 2300 may operate in the capacity of either a server or a client machine in server-client network environments, or it may act as a peer machine in peer-to-peer (or distributed) network environments. The architecture 2300 can be implemented in an embedded system, a personal computer (PC), a tablet PC, a hybrid tablet, a set-top box (STB), a personal digital assistant (MA), a mobile telephone, a web appliance, a network router, a network switch, a network bridge, or any machine capable of executing instructions (sequential or otherwise) that specify operations to be taken by that machine.

The example architecture 2300 includes a processor unit 2302 comprising at least one processor (e.g., a central processing unit (CPU), a graphics processing unit (GPU), or both, processor cores, compute nodes). The architecture 2300 may further comprise a main memory 2304 and a static memory 2306, which communicate with each other via a link 2308 (e.g., a bus). The architecture 2300 can further include a video display unit 2310, an input device 2312 (e.g., a keyboard), and a UI navigation device 2314 (e.g., a mouse). In some examples, the video display unit 2310, input device 2312, and UI navigation device 2314 are incorporated into a touchscreen display. The architecture 2300 may additionally include a storage device 2316 (e.g., a drive unit), a signal generation device 2318 (e.g., a speaker), a network interface device 2320, and one or more sensors (not shown), such as a Global Positioning System (GPS) sensor, compass, accelerometer, or other sensor.

In some examples, the processor unit 2302 or another suitable hardware component may support a hardware interrupt. In response to a hardware interrupt, the processor unit 2302 may pause its processing and execute an ISR, for example, as described herein.

The storage device 2316 includes a machine-readable medium 2322 on which is stored one or more sets of data structures and instructions 2324 (e.g., software) embodying or used by any one or more of the methodologies or functions described herein. The instructions 2324 can also reside, completely or at least partially, within the main memory 2304, within the static memory 2306, and/or within the processor unit 2302 during execution thereof by the architecture 2300, with the main memory 2304, the static memory 2306, and the processor unit 2302 also constituting machine-readable media.

Executable Instructions and Machine-Storage Medium

The various memories (i.e., 2304, 2306, and/or memory of the processor unit(s) 2302) and/or the storage device 2316 may store one or more sets of instructions and data structures (e.g., the instructions 2324) embodying or used by any one or more of the methodologies or functions described herein. These instructions, when executed by the processor unit(s) 2302, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-Mate memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 2324 can further be transmitted or received over a communications network 2326 using a transmission medium via the network interface device 2320 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., 3G, 4G Long-Term Evolution (LTE)/LTE-A, 5G, or WiMAX networks).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device, A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. An aerial vehicle comprising:
  a fuselage having:
    a nose end, and
    a tail end;
  a first wing member extending from the fuselage in a first direction, the first wing member comprising:
    a first drive motor coupled to a first rotor,
    a second drive motor coupled to a second rotor, and
    a third drive motor coupled to a third rotor,
    wherein, in a second direction perpendicular to the first direction, the first wing member and the third drive motor are positioned between the first drive motor and the second drive motor;
  a second wing member extending from the fuselage substantially opposite the first wing member;
  a first wing rotation motor coupled to rotate the first wing member about a first axis substantially perpendicular to a fuselage axis extending from the nose end to the tail end;
  a second wing rotation motor coupled to rotate the second wing member about a second axis substantially perpendicular to the fuselage axis; and
  a controller circuit configured to;
  differentially actuate the first motor and the second motor;
  detect a rotation failure of the second wing member based on one or more sensors that generate a signal based on a position of the second wing member; and
  responsive to the detecting of the failure, determine a combination of rotor speeds for the first, second, and third rotors and rotation positions for the first wing member that brings about a desired thrust vector and/or moment of torque for the aerial vehicle.

2. The aerial vehicle of claim 1, wherein the controller circuit is further configured to rotate the first wing member and the second wing member to generate a thrust vector towards the nose end of the fuselage while the fuselage axis is substantially parallel to a horizon.

3. The aerial vehicle of claim 1, wherein the controller circuit is further configured to:
  operate the aerial vehicle in a first control mode when the aerial vehicle is above a threshold altitude; and
  operate the aerial vehicle in a second control mode when the aerial vehicle is below the threshold altitude, wherein the first wing rotation motor and the second wing rotation motor are maintained at a substantially constant revolution rate in the second control mode.

4. The aerial vehicle of claim 1, wherein the second wing member extends from the fuselage in a third direction, and wherein the second wing member comprises:
  a fourth drive motor coupled to a fourth rotor;
  a fifth drive motor coupled to a fifth rotor; and
  a sixth drive motor coupled to a sixth rotor;
  wherein, in a fourth direction perpendicular to the third direction, the second wing member and the sixth drive motor are positioned between the third drive motor and the fourth drive motor.

5. The aerial vehicle of claim 4, wherein the controller circuit is further configured to:
  energize the first drive motor and the fourth drive motor to maintain the first rotor and the fourth rotor at a constant revolution rate; and
  energize the first wing rotation motor or the second wing rotation motor to generate a thrust vector that changes an attitude of the aerial vehicle.

6. The aerial vehicle of claim 1 wherein the controller circuit is further configured to:
  determine the position of the second wing member based on a current position of the second wing rotation motor.

7. The aerial vehicle of claim 1, wherein the controller circuit is further configured to energize the first wing rotation motor or the second wing rotation motor to generate a vertical thrust vector with the fuselage axis not parallel to a horizon.

8. The aerial vehicle of claim 1, further comprising a stationary tail coupled to the fuselage.

9. An aerial vehicle comprising:
  a fuselage having:
    a nose end, and
    a tail end;
  a first wing member extending from the fuselage in a first direction, the first wing member comprising:
    a first drive motor coupled to a first rotor,
    a second drive motor coupled to a second rotor, and
    a third drive motor coupled to a third rotor,
    wherein, in a second direction perpendicular to the first direction, the first wing member and the third drive motor are positioned between the first drive motor and the second drive motor;
  a second wing member extending from the fuselage substantially opposite the first wing member;

a first wing rotation motor coupled to rotate the first wing member about a first axis substantially perpendicular to a fuselage axis extending from the nose end to the tail end;
a second wing rotation motor coupled to rotate the second wing member about a second axis substantially perpendicular to the fuselage axis; and
a controller circuit configured to differentially actuate the first wing rotation motor and the second wing rotation motor,
   wherein the first wing member is coupled to the first wing rotation motor by bevel gears configured with a gear ratio such that expected aerodynamic forces on the first wing member do not cause the first wing member to rotate absent input from the first wing rotation motor.

* * * * *